United States Patent
Bojkova et al.

(10) Patent No.: US 9,568,643 B2
(45) Date of Patent: Feb. 14, 2017

(54) POLYURETHANE UREA-CONTAINING COMPOSITIONS AND OPTICAL ARTICLES AND METHODS FOR PREPARING THEM

(71) Applicant: PPG INDUSTRIES OHIO, INC., Cleveland, OH (US)

(72) Inventors: Nina Vassileva Bojkova, Monroeville, PA (US); Marvin Jerome Graham, Monroeville, PA (US); Matthew John Kryger, Pittsburgh, PA (US); Federico Menta, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 303 days.

(21) Appl. No.: 14/101,903

(22) Filed: Dec. 10, 2013

(65) Prior Publication Data

US 2014/0171612 A1 Jun. 19, 2014

Related U.S. Application Data

(60) Provisional application No. 61/736,716, filed on Dec. 13, 2012.

(51) Int. Cl.
| | | |
|---|---|---|
| G02B 1/04 | (2006.01) | |
| C08G 18/10 | (2006.01) | |
| C08G 18/32 | (2006.01) | |
| C08G 18/38 | (2006.01) | |
| C08L 75/02 | (2006.01) | |
| C08L 75/04 | (2006.01) | |
| C08L 81/00 | (2006.01) | |

(52) U.S. Cl.
CPC ............... *G02B 1/04* (2013.01); *C08G 18/10* (2013.01); *C08G 18/3203* (2013.01); *C08G 18/3271* (2013.01); *C08G 18/3876* (2013.01); *C08L 75/02* (2013.01); *C08L 75/04* (2013.01); *C08L 81/00* (2013.01); *G02B 1/041* (2013.01)

(58) Field of Classification Search
CPC .......... G02B 1/04; G02B 1/041; C08L 75/02; C08L 75/04; C08L 81/00; C08G 18/10; C08G 18/3876; C08G 18/3203; C08G 18/3271
See application file for complete search history.

(56) References Cited

U.S. PATENT DOCUMENTS

| | | |
|---|---|---|
| 2,370,567 A | 2/1945 | Muskat et al. |
| 2,403,113 A | 7/1946 | Muskat et al. |
| 2,644,007 A | 6/1953 | Irwin |
| 2,680,127 A | 6/1954 | Slocombe et al. |
| 2,908,703 A | 10/1959 | Latourette et al. |
| 2,965,650 A | 12/1960 | Howard |
| 2,965,651 A | 12/1960 | Kosmin |
| 3,169,945 A | 2/1965 | Hostettler et al. |
| 3,361,706 A | 1/1968 | Meriwether et al. |
| 3,562,172 A | 2/1971 | Ono et al. |
| 3,567,605 A | 3/1971 | Becker |
| 3,578,602 A | 5/1971 | Ono et al. |
| 3,592,798 A | 7/1971 | Oswald |
| 3,714,290 A | 1/1973 | Kehr et al. |
| 3,717,618 A | 2/1973 | Oswald |
| 3,725,229 A | 4/1973 | Kehr at al. |
| 3,729,403 A | 4/1973 | Kehr et al. |
| 3,766,148 A | 10/1973 | Taub |
| 3,866,242 A | 2/1975 | Slagel |
| 3,872,150 A | 3/1975 | Kehr et al. |
| 3,872,151 A | 3/1975 | Kehr et al. |
| 3,872,152 A | 3/1975 | Kehr et al. |
| 3,898,349 A | 8/1975 | Kehr et al. |
| 3,931,287 A | 1/1976 | Kehr et al. |
| 3,954,723 A | 5/1976 | Oswald |
| 3,971,892 A | 7/1976 | Schlichte |
| 4,059,570 A | 11/1977 | Oswald |
| 4,095,637 A | 6/1978 | Krishnan |
| 4,101,529 A | 7/1978 | Ammons |
| 4,153,777 A | 5/1979 | Slagel |
| 4,160,853 A | 7/1979 | Ammons |
| 4,166,043 A | 8/1979 | Uhlmann et al. |
| 4,208,507 A | 6/1980 | Stutz et al. |
| 4,215,010 A | 7/1980 | Hovey et al. |
| 4,342,668 A | 8/1982 | Hovey et al. |
| 4,365,051 A | 12/1982 | Chung et al. |
| 4,367,170 A | 1/1983 | Uhlmann et al. |
| 4,556,605 A | 12/1985 | Mogami et al. |
| 4,581,433 A | 4/1986 | Potter et al. |
| 4,637,698 A | 1/1987 | Kwak et al. |
| 4,719,296 A | 1/1988 | Irie et al. |
| 4,720,356 A | 1/1988 | Chu |
| 4,731,264 A | 3/1988 | Lin et al. |
| 4,756,973 A | 7/1988 | Sakagami et al. |
| 4,764,430 A | 8/1988 | Blackburn et al. |
| 4,798,745 A | 1/1989 | Martz et al. |
| 4,798,746 A | 1/1989 | Claar et al. |
| 4,808,690 A | 2/1989 | Slagel |

(Continued)

FOREIGN PATENT DOCUMENTS

| | | |
|---|---|---|
| EP | 0676429 A2 | 10/1995 |
| EP | 2110395 A1 | 10/2009 |

*Primary Examiner* — Rabon Sergent
(74) *Attorney, Agent, or Firm* — The Webb Law Firm

(57) ABSTRACT

A composition for the preparation of a transparent, non-elastomeric optical article is provided, the composition including:
(1) a polyisocyanate component containing one or more different polyisocyanates; and
(2) a component that is reactive with isocyanates, including:
 (a) optionally at least one polyol having a number average molecular weight greater than 500;
 (b) (i) at least one polyol and/or polythiol and (ii) at least one compound containing both amine and hydroxyl functional groups, wherein the compound (ii) has a number average molecular weight less than 500; and optionally
 (3) a urethanation catalyst.
Multi-step and one-pot methods of preparing a cured, non-elastomeric polyurethane-containing optical article are also provided.

14 Claims, No Drawings

(56) References Cited

U.S. PATENT DOCUMENTS

| | | |
|---|---|---|
| 4,810,812 A | 3/1989 | Matsuda et al. |
| 4,816,584 A | 3/1989 | Kwak et al. |
| 4,818,096 A | 4/1989 | Heller et al. |
| 4,826,977 A | 5/1989 | Heller et al. |
| 4,856,857 A | 8/1989 | Takeuchi et al. |
| 4,866,103 A | 9/1989 | Cassidy et al. |
| 4,873,027 A | 10/1989 | Umemoto et al. |
| 4,880,667 A | 11/1989 | Welch |
| 4,889,413 A | 12/1989 | Ormsby et al. |
| 4,892,920 A | 1/1990 | Quay et al. |
| 4,904,525 A | 2/1990 | Taniguchi et al. |
| 4,931,219 A | 6/1990 | Kwiatkowski et al. |
| 4,931,220 A | 6/1990 | Haynes et al. |
| 5,066,818 A | 11/1991 | Gemert et al. |
| 5,071,951 A | 12/1991 | Ulrich et al. |
| 5,104,692 A | 4/1992 | Belmares |
| 5,128,433 A | 7/1992 | LeCompte et al. |
| 5,134,191 A | 7/1992 | Takarada et al. |
| 5,158,922 A | 10/1992 | Hinney et al. |
| 5,166,345 A | 11/1992 | Akashi et al. |
| 5,196,485 A | 3/1993 | McMonigal et al. |
| 5,225,472 A | 7/1993 | Cameron et al. |
| 5,231,156 A | 7/1993 | Lin |
| 5,236,958 A | 8/1993 | Miyashita |
| 5,236,978 A | 8/1993 | Selvig et al. |
| 5,238,931 A | 8/1993 | Yoshikawa et al. |
| 5,239,012 A | 8/1993 | McEntire et al. |
| 5,252,742 A | 10/1993 | Miyashita |
| 5,256,452 A | 10/1993 | McMonigal et al. |
| 5,274,132 A | 12/1993 | VanGemert |
| 5,310,577 A | 5/1994 | Mase et al. |
| 5,323,191 A | 6/1994 | Firtion et al. |
| 5,352,758 A | 10/1994 | Kanemura et al. |
| 5,359,035 A | 10/1994 | Habermann |
| 5,359,085 A | 10/1994 | Iwamoto et al. |
| 5,373,033 A | 12/1994 | Toh et al. |
| 5,384,077 A | 1/1995 | Knowles |
| 5,384,379 A | 1/1995 | Bader et al. |
| 5,391,327 A | 2/1995 | Ligas et al. |
| 5,405,958 A | 4/1995 | VanGemert |
| 5,429,774 A | 7/1995 | Kumar |
| 5,462,806 A | 10/1995 | Konishi et al. |
| 5,466,398 A | 11/1995 | Van Gemert et al. |
| 5,470,813 A | 11/1995 | Le-Khac |
| 5,482,908 A | 1/1996 | Le-Khac |
| 5,488,119 A | 1/1996 | Fischer-Reimann et al. |
| 5,496,641 A | 3/1996 | Mase et al. |
| 5,498,686 A | 3/1996 | Effer et al. |
| 5,552,091 A | 9/1996 | Kumar |
| 5,602,198 A | 2/1997 | Das et al. |
| 5,618,586 A | 4/1997 | Swarup et al. |
| 5,621,017 A | 4/1997 | Kobayakawa et al. |
| 5,631,339 A | 5/1997 | Faler et al. |
| 5,645,767 A | 7/1997 | Van Gemert |
| 5,646,230 A | 7/1997 | Pantone et al. |
| 5,658,501 A | 8/1997 | Kumar et al. |
| 5,663,244 A | 9/1997 | Barancyk et al. |
| 5,679,756 A | 10/1997 | Zhu et al. |
| 5,684,083 A | 11/1997 | Temple et al. |
| 5,693,738 A | 12/1997 | Okazaki et al. |
| 5,698,141 A | 12/1997 | Kumar |
| 5,739,243 A | 4/1998 | Herold et al. |
| 5,753,146 A | 5/1998 | Van Gemert et al. |
| 5,770,115 A | 6/1998 | Misura |
| 5,776,376 A | 7/1998 | Nagoh et al. |
| 5,807,975 A | 9/1998 | Amagai et al. |
| 5,811,503 A | 9/1998 | Herold et al. |
| 5,811,506 A | 9/1998 | Slagel |
| 5,814,410 A | 9/1998 | Singer et al. |
| 5,821,287 A | 10/1998 | Hu et al. |
| 5,830,578 A | 11/1998 | Ono et al. |
| 5,910,522 A | 6/1999 | Schmidt et al. |
| 5,917,006 A | 6/1999 | Smith et al. |
| 5,932,681 A | 8/1999 | Herold et al. |
| 5,942,158 A | 8/1999 | Okoroafor et al. |
| 5,945,504 A | 8/1999 | Amagi et al. |
| 5,961,889 A | 10/1999 | Jiang et al. |
| 5,962,617 A | 10/1999 | Slagel |
| 5,962,619 A | 10/1999 | Seneker et al. |
| 5,976,422 A | 11/1999 | Okoroafor et al. |
| 5,976,701 A | 11/1999 | Barancyk et al. |
| 6,025,026 A | 2/2000 | Smith et al. |
| 6,042,737 A | 3/2000 | Basil et al. |
| 6,060,001 A | 5/2000 | Welch et al. |
| 6,100,362 A | 8/2000 | Okazaki et al. |
| 6,113,814 A | 9/2000 | Gemert et al. |
| 6,127,505 A | 10/2000 | Slagel |
| 6,130,307 A | 10/2000 | Amagai et al. |
| 6,150,430 A | 11/2000 | Walters et al. |
| 6,153,126 A | 11/2000 | Kumar |
| 6,166,129 A | 12/2000 | Rosthauser et al. |
| 6,174,984 B1 | 1/2001 | Peter |
| 6,175,450 B1 | 1/2001 | Andreani et al. |
| 6,187,444 B1 | 2/2001 | Bowles, III et al. |
| 6,268,055 B1 | 7/2001 | Walters et al. |
| 6,296,785 B1 | 10/2001 | Nelson et al. |
| 6,342,571 B1 | 1/2002 | Smith et al. |
| 6,348,604 B1 | 2/2002 | Nelson et al. |
| 6,353,039 B1 | 3/2002 | Rheinberger et al. |
| 6,353,102 B1 | 3/2002 | Kumar |
| 6,417,273 B1 | 7/2002 | Koinuma et al. |
| 6,432,526 B1 | 8/2002 | Arney et al. |
| 6,432,544 B1 | 8/2002 | Stewart et al. |
| 6,433,043 B1 | 8/2002 | Misura et al. |
| 6,436,525 B1 | 8/2002 | Welch et al. |
| 6,441,119 B1 | 8/2002 | Kosaka |
| 6,472,495 B1 | 10/2002 | Yoshimura et al. |
| 6,506,488 B1 | 1/2003 | Stewart et al. |
| 6,509,418 B1 | 1/2003 | Zook et al. |
| 6,531,076 B2 | 3/2003 | Crano et al. |
| 6,555,028 B2 | 4/2003 | Walters et al. |
| 6,602,603 B2 | 8/2003 | Welch et al. |
| 6,631,021 B2 | 10/2003 | Smith et al. |
| 6,669,873 B1 | 12/2003 | Smith et al. |
| 6,733,887 B2 | 5/2004 | Okoroafor et al. |
| 7,009,032 B2 | 3/2006 | Bojkova et al. |
| 7,098,290 B1 | 8/2006 | Okoroafor et al. |
| 7,144,969 B2 | 12/2006 | McDonald |
| 7,169,375 B2 | 1/2007 | Chisholm |
| 7,411,034 B2 | 8/2008 | Bojkova et al. |
| 7,491,790 B2 | 2/2009 | Bojkova et al. |
| 7,553,925 B2 | 6/2009 | Bojkova |
| 7,687,597 B2 | 3/2010 | Bojkova |
| 7,696,296 B2 | 4/2010 | Bojkova et al. |
| 8,017,720 B2 | 9/2011 | Bojkova et al. |
| 8,563,213 B2 | 10/2013 | Bowles et al. |
| 2001/0047043 A1 | 11/2001 | Okoroafor et al. |
| 2003/0096935 A1 | 5/2003 | Nagpal et al. |
| 2003/0144452 A1 | 7/2003 | Jallouli et al. |
| 2003/0149217 A1 | 8/2003 | Bojkova et al. |
| 2004/0138401 A1 | 7/2004 | Bojkova et al. |
| 2005/0084686 A1* | 4/2005 | Imaizumi ............ C08G 18/0823 428/425.5 |
| 2005/0282991 A1 | 12/2005 | Bojkova et al. |
| 2006/0008596 A1 | 1/2006 | Pokorny et al. |
| 2008/0146759 A1 | 6/2008 | Takashima et al. |
| 2009/0264587 A1* | 10/2009 | Blum ................ C08G 18/0823 524/591 |
| 2010/0221661 A1* | 9/2010 | Bowles ............... C08F 290/067 430/280.1 |

\* cited by examiner

US 9,568,643 B2

POLYURETHANE UREA-CONTAINING COMPOSITIONS AND OPTICAL ARTICLES AND METHODS FOR PREPARING THEM

CROSS REFERENCE TO RELATED APPLICATIONS

This application claims the benefit of priority from U.S. Provisional Patent Application No. 61/736,716, filed Dec. 13, 2012, which is incorporated herein by reference in its entirety.

FIELD OF THE INVENTION

The present invention relates to cured, non-elastomeric polyurethane urea-containing compositions and optical articles and methods of preparing them.

BACKGROUND OF THE INVENTION

Polyurethane-containing materials such as polyurethane-ureas have been developed as useful polymers in the manufacture of optical articles because of their excellent properties such as low birefringence, resilience, and chemical and impact resistance. They have been used in mold castings for lenses, glazings, and the like. Urea linkages in the polymers are particularly responsible for the superior thermal and mechanical properties such as hardness and stiffness. Aromatic polyamines have been used to prepare these urea-functional polymers. However, cost concerns are prompting searches for and development of alternative starting materials. Aliphatic polyamines tend to be highly reactive with isocyanate, making processing very difficult. New reaction methodology is necessary to allow for the use of readily available and inexpensive materials while still providing products with superior properties.

It would be desirable to provide a cost effective, straightforward method of preparing polyurethane-containing optical articles that demonstrate outstanding properties.

SUMMARY OF THE INVENTION

In accordance with the present invention, a composition for the preparation of a transparent, non-elastomeric optical article is provided. The composition comprises:
(1) a polyisocyanate component comprising one or more different polyisocyanates; and
(2) a component that is reactive with isocyanates, comprising:
   (a) optionally, at least one polyol having a number average molecular weight greater than 500;
   (b) (i) at least one polyol and/or polythiol and (ii) at least one compound containing both amine and hydroxyl functional groups, wherein the compound (ii) has a number average molecular weight less than 500; and optionally
   (3) a urethanation catalyst.

Also provided in a separate embodiment of the present invention is a separate composition for the preparation of a transparent, non-elastomeric optical article, the composition comprising:
(1) a polyisocyanate component comprising one or more different polyisocyanates; and
(2) a component that is reactive with isocyanates, comprising:
   (a) optionally at least one polyol having a number average molecular weight greater than 500;
   (b) (i) at least one polyol and/or polythiol and, optionally (ii) at least one compound containing both amine and hydroxyl functional groups, wherein the compound (ii) has a number average molecular weight less than 500; and
   (c) a urea-containing diol reaction product of a reaction mixture substantially free of urethanation catalyst, the reaction mixture comprising a diisocyanate and at least one aliphatic compound containing both amine and hydroxyl functional groups, wherein the equivalent ratio of amine functional groups to isocyanate functional groups is at least 1; and optionally
   (3) a urethanation catalyst.

Methods of preparing a transparent, non-elastomeric optical article are also provided, one comprising:
(1) combining to form a reaction mixture that is essentially free of urethanation catalysts:
   (a) a polyisocyanate component comprising one or more different polyisocyanates; and
   (b) an active hydrogen component comprising at least one polyol and/or polythiol and at least one compound containing both amine and hydroxyl functional groups wherein the compound containing both amine and hydroxyl functional groups has the structure $H_2N$-L-OH, wherein L is a linear or branched alkyl, aryl, aralkyl, or alkaryl chain which may contain hetero atoms;
(2) allowing the polyisocyanate component to react with amine functional groups in the active hydrogen component at a temperature and for a time sufficient to form an intermediate product comprising a polyurea prepolymer having hydroxyl functional groups in admixture with the polyol and/or polythiol and, optionally, the compound containing both amine and hydroxyl functional groups;
(3) mixing the intermediate product formed in step (2) with additional polyisocyanates and optionally a urethanation catalyst to form a second reaction mixture;
(4) introducing the second reaction mixture formed in step (3) to a mold of a desired shape at a temperature and for a time sufficient to form a thermoset polymerizate; and
(5) releasing the polymerizate from the mold to yield a transparent optical article.

Also provided in a separate embodiment of the present invention is a "single batch" or "one pot" method of preparing a transparent, non-elastomeric optical article comprising:
(1) combining to form a reaction mixture:
   (a) a polyisocyanate component comprising one or more different polyisocyanates; and
   (b) an active hydrogen component comprising:
      (b1) a first component that is essentially free of amino groups comprising at least one polyol; and
      (b2) a second component comprising at least one polyol and/or polythiol and at least one compound containing both amine and hydroxyl functional groups and has the structure $H_2N$-L-OH, wherein L is a linear or branched alkyl, aryl, aralkyl, or alkaryl chain which may contain hetero atoms, wherein the at least one polyol has a number average molecular weight of 60 to 450;
(2) introducing the reaction mixture to a mold of a desired shape at a temperature and for a time sufficient to form a thermoset polymerizate; and
(3) releasing the polymerizate from the mold to yield a transparent optical article.

In an additional embodiment of the present invention, a method of preparing a cured, non-elastomeric polyurethane-containing optical article is provided. The method comprises:

(1) combining to form a reaction mixture that is essentially free of urethanation catalysts:
   (a) a polyisocyanate component comprising one or more different polyisocyanates; and
   (b) an active hydrogen component comprising at least one polyol and/or polythiol and at least one compound containing both amine and hydroxyl functional groups wherein the compound containing both amine and hydroxyl functional groups is present in stoichiometric excess with respect to amine groups relative to isocyanate functional groups and has the structure $H_2N$-L-OH, wherein L is a linear or branched alkyl, aryl, aralkyl, or alkaryl chain which may contain hetero atoms;

(2) allowing the polyisocyanate component to react with at least a portion of the amine functional groups in the active hydrogen component at a temperature and for a time sufficient to consume essentially all of the isocyanate functional groups and form an intermediate product comprising a polyurea prepolymer having hydroxyl functional groups in admixture with the polyol and the compound containing both amine and hydroxyl functional groups;

(3) mixing the intermediate product formed in step (2) with additional polyisocyanates and a urethanation catalyst to form a second reaction mixture;

(4) introducing the second reaction mixture formed in step (3) to a mold of a desired shape at a temperature and for a time sufficient to form a thermoset polymerizate; and (5) releasing the polymerizate from the mold to yield a transparent optical article.

In an additional embodiment of the present invention, a method of preparing a cured, non-elastomeric polyurethane-containing optical article is provided. The method comprises:

(1) combining to form a reaction mixture:
   (a) a polyisocyanate component comprising one or more different polyisocyanates; and
   (b) at least one polyol, wherein the polyisocyanate component is present in stoichiometric excess relative to hydroxyl functional groups;

(2) allowing the components to react at a temperature and for a time sufficient to consume essentially all of the hydroxyl functional groups and form an intermediate product comprising a polyurethane prepolymer having isocyanate functional groups in admixture with excess polyisocyanate;

(3) mixing the intermediate product formed in step (2) with optionally an active hydrogen component comprising at least one polyol and/or polythiol, and at least one compound containing both amine and hydroxyl functional groups wherein the compound containing both amine and hydroxyl functional groups has the structure $H_2N$-L-OH, wherein L is a linear or branched alkyl, aryl, aralkyl, or alkaryl chain which may contain hetero atoms, to form a second reaction mixture;

(4) introducing the second reaction mixture formed in step (3) via injection to a mold of a desired shape at a temperature and for a time sufficient to form a thermoset polymerizate; and (5) releasing the polymerizate from the mold to yield a transparent optical article.

DETAILED DESCRIPTION OF THE INVENTION

It is noted that, as used in this specification and the appended claims, the singular forms "a," "an," and "the" include plural referents unless expressly and unequivocally limited to one referent.

For the purposes of this specification, unless otherwise indicated, all numbers expressing quantities of ingredients, reaction conditions, and other parameters used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

All numerical ranges herein include all numerical values and ranges of all numerical values within the recited numerical ranges. Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

The various embodiments and examples of the present invention as presented herein are each understood to be non-limiting with respect to the scope of the invention.

As used in the following description and claims, the following terms have the indicated meanings:

The terms "acrylic" and "acrylate" are used interchangeably (unless to do so would alter the intended meaning) and include acrylic acids, anhydrides, and derivatives thereof, such as their $C_1$-$C_5$ alkyl esters, lower alkyl-substituted acrylic acids, e.g., $C_1$-$C_5$ substituted acrylic acids, such as methacrylic acid, ethacrylic acid, etc., and their $C_1$-$C_5$ alkyl esters, unless clearly indicated otherwise. The terms "(meth) acrylic" or "(meth)acrylate" are intended to cover both the acrylic/acrylate and methacrylic/methacrylate forms of the indicated material, e.g., a (meth)acrylate monomer.

The term "cure", "cured" or similar terms, as used in connection with a cured or curable composition, e.g., a "cured composition" of some specific description, means that at least a portion of the polymerizable and/or crosslinkable components that form the curable composition is at least partially polymerized and/or crosslinked. The term "curable", as used for example in connection with a curable film-forming composition, means that the indicated composition is polymerizable or cross linkable, e.g., by means that include, but are not limited to, thermal, catalytic, electron beam, chemical free-radical initiation, and/or photoinitiation such as by exposure to ultraviolet light or other actinic radiation. In the context of the present invention, a "cured" composition may continue to be further curable depending on the availability of polymerizable or crosslinkable components.

By "thermoset" is meant a polymer that irreversibly cures or crosslinks. Once solidified after curing, a thermoset polymer cannot be reheated and melted back to a liquid form, in contrast to a thermoplastic polymer.

The term "non-elastomeric" refers to materials that do not exhibit typical elastomeric behavior; i.e., they do not readily undergo reversible deformation or elongation to at least twice their original length.

The term "optical quality", as used for example in connection with polymeric materials, e.g., a "resin of optical quality" or "organic polymeric material of optical quality" means that the indicated material, e.g., a polymeric material, resin, or resin composition, is or forms a substrate, layer, film or coating that can be used as an optical article, such as an ophthalmic lens, or in combination with an optical article, because of its suitable optical properties.

The term "transparent", as used for example in connection with a substrate, film, material and/or coating, means that the indicated substrate, coating, film and/or material has the property of transmitting light without appreciable scattering so that objects lying beyond are entirely visible. As used herein, transparent articles demonstrate a light transmittance of at least 80%.

The composition of the present invention is suitable for the preparation of a transparent, non-elastomeric optical article, and comprises:
(1) a polyisocyanate component comprising one or more different polyisocyanates; and
(2) a component that is reactive with isocyanates, comprising:
(a) optionally at least one polyol having a number average molecular weight greater than 500;
(b) (i) at least one polyol and/or polythiol and (ii) at least one compound containing both amine and hydroxyl functional groups, wherein the compound (ii) has a number average molecular weight less than 500; and optionally
(3) a urethanation catalyst. Note that each of components (2)(a) and (2)(b) may be present in an amount of 20 to 80 percent by weight, based on the total weight of resin solids in the component (2).

Also provided in a separate embodiment of the present invention is a separate composition for the preparation of a transparent, non-elastomeric optical article, the composition comprising:
(1) a polyisocyanate component comprising one or more different polyisocyanates; and
(2) a component that is reactive with isocyanates, comprising:
(a) optionally at least one polyol having a number average molecular weight greater than 500;
(b) (i) at least one polyol and/or polythiol and, optionally (ii) at least one compound containing both amine and hydroxyl functional groups, wherein the compound (ii) has a number average molecular weight less than 500; and
(c) a urea-containing diol reaction product of a reaction mixture substantially free of urethanation catalyst, the reaction mixture comprising a diisocyanate and at least one aliphatic compound containing both amine and hydroxyl functional groups, wherein the equivalent ratio of amine functional groups to isocyanate functional groups is at least 1; and optionally
(3) a urethanation catalyst. Again, each of components (2)(a) and (2)(b) may be present in an amount of 20 to 80 percent by weight, based on the total weight of resin solids in the component (2).

Each of the components of the compositions above may be selected from those described in detail below with respect to the processes of the present invention.

According to the present invention, a method of preparing a cured, non-elastomeric polyurethane-containing optical article is provided. Optical articles prepared by the process of the present invention include, for example, camera lenses, ophthalmic articles such as piano (without optical power) and vision correcting (prescription) lenses (finished and semi-finished) including multifocal lenses (bifocal, trifocal, and progressive lenses); and ocular devices such as contact lenses and intraocular lenses, sun lenses, fashion lenses, sport masks, face shields and goggles. The optical article also may be chosen from glazings such as architectural windows and transparencies such as display screens, automobile or aircraft windshields, and vehicular side windows.

In the first step of the method of the present invention, a reaction mixture is formed that is essentially free of urethanation catalysts. The reaction mixture is formed by combining (a) a polyisocyanate component and (b) an active hydrogen component.

The polyisocyanate component comprises one or more different polyisocyanates. Polyisocyanates useful in the first component are numerous and widely varied. Non-limiting examples can include aliphatic polyisocyanates, cycloaliphatic polyisocyanates wherein one or more of the isocyanato groups are attached directly to the cycloaliphatic ring, cycloaliphatic polyisocyanates wherein one or more of the isocyanato groups are not attached directly to the cycloaliphatic ring, aromatic polyisocyanates wherein one or more of the isocyanato groups are attached directly to the aromatic ring, and aromatic polyisocyanates wherein one or more of the isocyanato groups are not attached directly to the aromatic ring, and mixtures thereof. When an aromatic polyisocyanate is used, generally care should be taken to select a material that does not cause the polyurethane-containing polymer to color (e.g., yellow).

The polyisocyanate can include but is not limited to aliphatic or cycloaliphatic diisocyanates, aromatic diisocyanates, cyclic dimers and cyclic trimers thereof, and mixtures thereof. Non-limiting examples of suitable polyisocyanates can include Desmodur N 3300 (hexamethylene diisocyanate trimer) which is commercially available from Bayer; Desmodur N 3400 (60% hexamethylene diisocyanate dimer and 40% hexamethylene diisocyanate trimer). In a non-limiting embodiment, the polyisocyanate can include dicyclohexylmethane diisocyanate and isomeric mixtures thereof. As used herein and the claims, the term "isomeric mixtures" refers to a mixture of the cis-cis, trans-trans, and/or cis-trans isomers of the polyisocyanate. Non-limiting examples of isomeric mixtures for use in the present invention can include the trans-trans isomer of 4,4'-methylenebis(cyclohexyl isocyanate), hereinafter referred to as "PICM" (paraisocyanato cyclohexylmethane), the cis-trans isomer of PICM, the cis-cis isomer of PICM, and mixtures thereof.

Suitable isomers for use in the present invention include but are not limited to the following three isomers of 4,4'-methylenebis(cyclohexyl isocyanate), also known as dicyclohexylmethane diisocyanate.

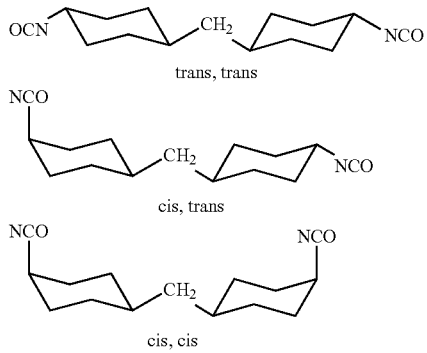

PICM can be prepared by phosgenating 4,4'-methylenebis (cyclohexyl amine) (PACM) by procedures well known in the art such as the procedures disclosed in U.S. Pat. Nos.

2,644,007; 2,680,127 and 2,908,703; which are incorporated herein by reference. The PACM isomer mixtures, upon phosgenation, can produce PICM in a liquid phase, a partially liquid phase, or a solid phase at room temperature. Alternatively, the PACM isomer mixtures can be obtained by the hydrogenation of methylenedianiline and/or by fractional crystallization of PACM isomer mixtures in the presence of water and alcohols such as methanol and ethanol. Additional aliphatic and cycloaliphatic diisocyanates that can be used include hexamethylene diisocyanate, dicyclohexylmethane diisocyanate, diphenylmethane-4,4'-diisocyanate, 3-isocyanato-methyl-3,5,5-trimethyl cyclohexyl-isocyanate ("IPDI") which is commercially available from Arco Chemical, m-xylylene diisocyanate ("MXDI") and meta-tetramethylxylylene diisocyanate (1,3-bis(1-isocyanato-1-methylethyl)-benzene) which is commercially available from Cytec Industries Inc. under the trade name TMXDI® (Meta) Aliphatic Isocyanate.

As used herein and the claims, the term "aliphatic and cycloaliphatic diisocyanates" refers to 6 to 100 carbon atoms linked in a straight chain or cyclized having two isocyanate reactive end groups. In a non-limiting embodiment of the present invention, the aliphatic and cycloaliphatic diisocyanates for use in the present invention can include IPDI and compounds of the formula R—(NCO)$_2$ wherein R represents an aliphatic group or a cycloaliphatic group.

In a particular embodiment of the present invention, the polyisocyanate component comprises isophorone diisocyanate, dicyclohexylmethane diisocyanate, hexamethylene diisocyanate, diphenylmethane-4,4'-diisocyanate, meta-tetramethylxylylene diisocyanate, (1,3-bis(1-isocyanato-1-methylethyl)-benzene), and/or meta-xylylene diisocyanate.

The active hydrogen component (b) used to form the reaction mixture comprises at least one polyol and/or polythiol and at least one compound containing both amine and hydroxyl functional groups (i.e., an amino alcohol). In certain embodiments the active hydrogen component (b) used to form the reaction mixture comprises at least two polyols and at least one amino alcohol.

In particular embodiments of the present invention the reaction mixture is essentially free of compounds containing both amino and aromatic functional groups wherein the amino groups are attached directly to the aromatic ring. The reaction mixture may also be essentially free of polyamines. Typically, the amino alcohol is aliphatic.

Suitable polyols can include but are not limited to polyether polyols, polyester polyols, polycaprolactone polyols, polycarbonate polyols, and mixtures thereof. Monomeric polyols such as butanediol, 1,6-hexanediol, Bisphenol A and the like, or other higher polyols such as trimethylolpropane, pentaerythritol, and the like, and any of the low molecular weight diols or glycols listed below are also suitable. At least one of the polyols in the active hydrogen component may contain aromatic functionality. It is believed that the use of aromatic polyols increases the refractive index (RI) of the optical article being prepared. However, it is preferred that when at least one of the polyols is an aromatic ring-containing polyol, the hydroxyl groups in the polyol are not directly bonded to aromatic ring; i.e., the aromatic polyols are not phenolic.

Examples of polyether polyols are polyalkylene ether polyols which include those having the following structural formula:

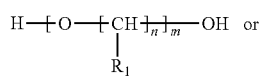 or

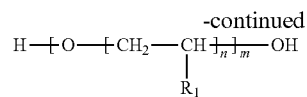

where the substituent R1 is hydrogen or lower alkyl containing from 1 to 5 carbon atoms including mixed substituents, and n is typically from 2 to 6 and m is from 8 to 100 or higher. Included are poly(oxytetramethylene) glycols, poly(oxytetraethylene) glycols, poly(oxy-1,2-propylene) glycols, and poly(oxy-1,2-butylene) glycols. Non-limiting examples of alkylene oxides can include ethylene oxide, propylene oxide, butylene oxide, amylene oxide, aralkylene oxides, such as but not limited to styrene oxide, mixtures of ethylene oxide and propylene oxide. In a further non-limiting embodiment, polyoxyalkylene polyols can be prepared with mixtures of alkylene oxide using random or step-wise oxyalkylation.

Also useful are polyether polyols formed from oxyalkylation of various polyols, for example, diols such as ethylene glycol, 1,6-hexanediol, Bisphenol A and the like, or other higher polyols such as trimethylolpropane, pentaerythritol, and the like. Polyols of higher functionality which can be utilized as indicated can be made, for instance, by oxyalkylation of compounds such as sucrose or sorbitol. One commonly utilized oxyalkylation method is reaction of a polyol with an alkylene oxide, for example, propylene or ethylene oxide, in the presence of an acidic or basic catalyst. Particular polyethers include those sold under the names TERATHANE and TERACOL, available from E. I. Du Pont de Nemours and Company, Inc., and POLYMEG, available from Q O Chemicals, Inc., a subsidiary of Great Lakes Chemical Corp.

Polyether glycols for use in the present invention can include but are not limited to polytetramethylene ether glycol.

The polyether-containing polyol can comprise block copolymers including blocks of ethylene oxide-propylene oxide and/or ethylene oxide-butylene oxide. Pluronic R, Pluronic L62D, Tetronic R and Tetronic, which are commercially available from BASF, can be used as the polyether-containing polyol material in the present invention.

Suitable polyester glycols can include but are not limited to the esterification products of one or more dicarboxylic acids having from four to ten carbon atoms, such as adipic, succinic or sebacic acids, with one or more low molecular weight glycols or diols having from two to ten carbon atoms, such as ethylene glycol, propylene glycol, diethylene glycol, 1,4-butanediol, neopentyl glycol, 1,6-hexanediol and 1,10-decanediol. In a non-limiting embodiment, the polyester glycols can be the esterification products of adipic acid with diols of from two to ten carbon atoms.

Suitable polycaprolactone glycols for use in the present invention can include the reaction products of E-caprolactone with one or more of the low molecular weight glycols listed above. A polycaprolactone may be prepared by condensing caprolactone in the presence of a difunctional active hydrogen compound such as water or at least one of the low molecular weight glycols listed above. Particular examples of polycaprolactone glycols include polycaprolactone polyesterdiols available as CAPA® 2047 and CAPA® 2077 from Solvay Corp.

Polycarbonate polyols are known in the art and are commercially available such as Ravecarb™ 107 (Enichem S.p.A.). In a non-limiting embodiment, the polycarbonate polyol can be produced by reacting an organic glycol such as a diol and a dialkyl carbonate, such as described in U.S. Pat. No. 4,160,853. In a non-limiting embodiment, the polyol can include polyhexamethyl carbonate having varying degrees of polymerization.

The glycol material can comprise low molecular weight polyols such as polyols having a molecular weight of less than 500, and compatible mixtures thereof. As used herein, the term "compatible" means that the glycols are mutually soluble in each other so as to form a single phase. Non-limiting examples of these polyols can include low molecular weight diols and triols. If used, the amount of triol is chosen so as to avoid a high degree of cross-linking in the polyurethane. A high degree of cross-linking can result in a curable polyurethane that is not formable by moderate heat and pressure. The organic glycol typically contains from 2 to 16, or from 2 to 6, or from 2 to 10, carbon atoms. Non-limiting examples of such glycols and other polyols can include ethylene glycol, propylene glycol, diethylene glycol, triethylene glycol, tetraethylene glycol, dipropylene glycol, tripropylene glycol, 1,2-, 1,3- and 1,4-butanediol, 2,2,4-trimethyl-1,3-pentanediol, 2-methyl-1,3-pentanediol, 1,3- 2,4- and 1,5-pentanediol, 2,5- and 1,6-hexanediol, 2,4-heptanediol, 2-ethyl-1,3-hexanediol, 2,2-dimethyl-1,3-propanediol, 1,8-octanediol, 1,9-nonanediol 1,10-decanediol, 1,4-cyclohexanediol, 1,4-cyclohexanedimethanol, 1,2-bis (hydroxyethyl)-cyclohexane, glycerin, tetramethylolmethane, such as but not limited to pentaerythritol, trimethylolethane and trimethylolpropane; and isomers thereof.

The polyol can have a weight average molecular weight, for example, of at least 60, or at least 90, or at least 200. Additionally, the polyol can have a weight average molecular weight, for example, of less than 10,000, or less than 7000, or less than 5000, or less than 2000.

The polyol for use in the present invention can include teresters produced from at least one low molecular weight dicarboxylic acid, such as adipic acid.

Polyester glycols and polycaprolactone glycols for use in the present invention can be prepared using known esterification or transesterification procedures as described, for example, in the article D. M. Young, F. Hostettler et al., "Polyesters from Lactone," Union Carbide F-40, p. 147.

Polyester glycols can also be prepared from the reaction of 1,6-hexanediol and adipic acid; 1,10-decandiol and adipic acid; or 1,10-decanediol and caprolactone.

Thiol-containing materials may be present in the active hydrogen component and may be used to produce a prepolymer such as a sulfur-containing isocyanate-functional polyurethane for the preparation of high index polyurethane-containing films; i.e., films having a relatively high refractive index. Note that in these embodiments the polyurethane prepolymer used as the first component may contain disulfide linkages due to disulfide linkages contained in the polythiol and/or polythiol oligomer used to prepare the polyurethane prepolymer.

Thiol-containing materials may have at least two thiol functional groups and may comprise a dithiol, or a mixture of a dithiol and a compound having more than two thiol functional groups (higher polythiol). Such mixtures may include mixtures of dithiols and/or mixtures of higher polythiols. The thiol functional groups are typically terminal groups, though a minor portion (i.e., less than 50 percent of all groups) may be pendant along a chain. The compound (a) may additionally contain a minor portion of other active hydrogen functionality (i.e., different from thiol), for example, hydroxyl functionality. Thiol-containing materials may be linear or branched, and may contain cyclic, alkyl, aryl, aralkyl, or alkaryl groups.

Thiol-containing materials may be selected so as to produce a substantially linear oligomeric polythiol. Therefore, the material comprises a mixture of a dithiol and a compound having more than two thiol functional groups, the compound having more than two thiol functional groups can be present in an amount up to 10 percent by weight of the mixture.

Suitable dithiols can include linear or branched aliphatic, cycloaliphatic, aromatic, heterocyclic, polymeric, oligomeric dithiols and mixtures thereof. The dithiol can comprise a variety of linkages including but not limited to ether linkages (—O—), sulfide linkages (—S—), polysulfide linkages (—$S_x$—, wherein x is at least 2, or from 2 to 4) and combinations of such linkages.

Non-limiting examples of suitable dithiols for use in the present invention can include but are not limited to 2,5-dimercaptomethyl-1,4-dithiane, dimercaptodiethylsulfide (DMDS), ethanedithiol, 3,6-dioxa-1,8-octanedithiol, ethylene glycol di(2-mercaptoacetate), ethylene glycol di(3-mercaptopropionate), poly(ethylene glycol) di(2-mercaptoacetate) and poly(ethylene glycol) di(3-mercaptopropionate), benzenedithiol, 4-tert-butyl-1,2-benzenedithiol, 4,4'-thiodibenzenethiol, and mixtures thereof.

The dithiol may include dithiol oligomers having disulfide linkages such as materials represented by the following formula:

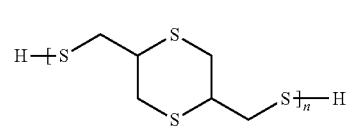

(I)

wherein n can represent an integer from 1 to 21.

Dithiol oligomers represented by Formula I can be prepared, for example, by the reaction of 2,5-dimercaptomethyl-1,4-dithiane with sulfur in the presence of basic catalyst, as known in the art.

The nature of the SH group in polythiols is such that oxidative coupling can occur readily, leading to formation of disulfide linkages. Various oxidizing agents can lead to such oxidative coupling. The oxygen in the air can in some cases lead to such oxidative coupling during storage of the polythiol. It is believed that a possible mechanism for the oxidative coupling of thiol groups involves the formation of thiyl radicals, followed by coupling of said thiyl radicals, to form disulfide linkage. It is further believed that formation of disulfide linkage can occur under conditions that can lead to the formation of thiyl radical, including but not limited to reaction conditions involving free radical initiation. The polythiols can include species containing disulfide linkages formed during storage.

The polythiols for use in material (ii) in the preparation of the polyurethane material in the first component can also include species containing disulfide linkages formed during synthesis of the polythiol.

In certain embodiments, the dithiol for use in the present invention, can include at least one dithiol represented by the following structural formulas:

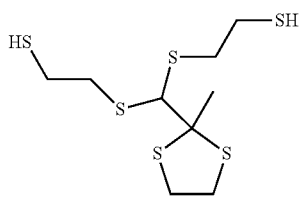
(II)

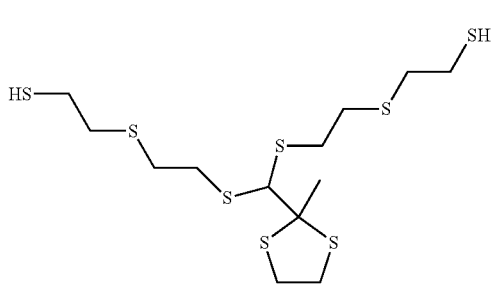
(III)

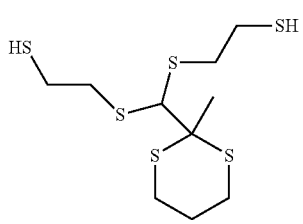
(IV)

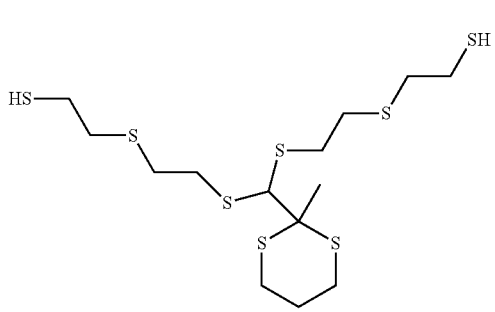
(V)

The sulfide-containing dithiols comprising 1,3-dithiolane (e.g., formulas II and III) or 1,3-dithiane (e.g., formulas IV and V) can be prepared by reacting asym-dichloroacetone with dimercaptan, and then reacting the reaction product with dimercaptoalkylsulfide, dimercaptan or mixtures thereof, as described in U.S. Pat. No. 7,009,032 B2.

Non-limiting examples of suitable dimercaptans for use in the reaction with asym-dichloroacetone can include but are not limited to materials represented by the following formula:

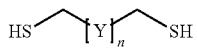
VI wherein Y can represent $CH_2$ or $(CH_2-S-CH_2)$, and n can be an integer from 0 to 5. The dimercaptan for reaction with asym-dichloroacetone in the present invention can be chosen from, for example, ethanedithiol, propanedithiol, and mixtures thereof.

The amount of asym-dichloroacetone and dimercaptan suitable for carrying out the above reaction can vary. For example, asym-dichloroacetone and dimercaptan can be present in the reaction mixture in an amount such that the molar ratio of dichloroacetone to dimercaptan can be from 1:1 to 1:10.

Suitable temperatures for reacting asym-dichloroacetone with dimercaptan can vary, often ranging from 0 to 100° C.

Non-limiting examples of suitable dimercaptans for use in the reaction with the reaction product of the asym-dichloroacetone and dimercaptan, can include but are not limited to materials represented by the above general formula VI, aromatic dimercaptans, cycloalkyl dimercaptans, heterocyclic dimercaptans, branched dimercaptans, and mixtures thereof.

Non-limiting examples of suitable dimercaptoalkylsulfides for use in the reaction with the reaction product of the asym-dichloroacetone and dimercaptan, can include materials represented by the following formula:

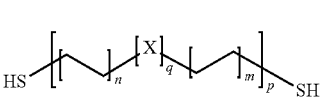
VII wherein X can represent O, S or Se, n can be an integer from 0 to 10, m can be an integer from 0 to 10, p can be an integer from 1 to 10, q can be an integer from 0 to 3, and with the proviso that (m+n) is an integer from 1 to 20.

Non-limiting examples of suitable dimercaptoalkylsulfides for use in the present invention can include branched dimercaptoalkylsulfides.

The amount of dimercaptan, dimercaptoalkylsulfide, or mixtures thereof, suitable for reacting with the reaction product of asym-dichloroacetone and dimercaptan, can vary. Typically, dimercaptan, dimercaptoalkylsulfide, or a mixture thereof, can be present in the reaction mixture in an amount such that the equivalent ratio of reaction product to dimercaptan, dimercaptoalkylsulfide, or a mixture thereof, can be from 1:1.01 to 1:2. Moreover, suitable temperatures for carrying out this reaction can vary within the range of from 0 to 100° C.

The reaction of asym-dichloroacetone with dimercaptan can be carried out in the presence of an acid catalyst. The acid catalyst can be selected from a wide variety known in the art, such as but not limited to Lewis acids and Bronsted acids. Non-limiting examples of suitable acid catalysts can include those described in Ullmann's Encyclopedia of Industrial Chemistry, 5$^{th}$ Edition, 1992, Volume A21, pp. 673 to 674. The acid catalyst is often chosen from boron trifluoride etherate, hydrogen chloride, toluenesulfonic acid, and mixtures thereof. The amount of acid catalyst can vary from 0.01 to 10 percent by weight of the reaction mixture.

The reaction product of asym-dichloroacetone and dimercaptan can alternatively be reacted with dimercaptoalkylsulfide, dimercaptan or mixtures thereof, in the presence of a base. The base can be selected from a wide variety known in the art, such as but not limited to Lewis bases and Bronsted bases. Non-limiting examples of suitable bases can include those described in Ullmann's Encyclopedia of Industrial Chemistry, 5$^{th}$ Edition, 1992, Volume A21, pp. 673 to 674. The base is often sodium hydroxide. The amount of base can vary. Typically, a suitable equivalent ratio of base to reaction product of the first reaction, can be from 1:1 to 10:1.

The reaction of asym-dichloroacetone with dimercaptan can be carried out in the presence of a solvent. The solvent can be selected from but is not limited to organic solvents. Non-limiting examples of suitable solvents can include but are not limited to chloroform, dichloromethane, 1,2-dichloroethane, diethyl ether, benzene, toluene, acetic acid and mixtures thereof.

In another embodiment, the reaction product of asym-dichloroacetone and dimercaptan can be reacted with dimercaptoalkylsulfide, dimercaptan or mixtures thereof, with or without the presence of a solvent, wherein the solvent can be selected from but is not limited to organic solvents. Non-limiting examples of suitable organic solvents can include alcohols such as but not limited to methanol, ethanol and propanol; aromatic hydrocarbon solvents such as but not limited to benzene, toluene, xylene; ketones such as but not limited to methyl ethyl ketone; water; and mixtures thereof.

The reaction of asym-dichloroacetone with dimercaptan can also be carried out in the presence of a dehydrating reagent. The dehydrating reagent can be selected from a wide variety known in the art. Suitable dehydrating reagents for use in this reaction can include but are not limited to magnesium sulfate. The amount of dehydrating reagent can vary widely according to the stoichiometry of the dehydrating reaction.

The polythiols for use in material (ii) in the preparation of the polyurethane material in the first component can be prepared in certain non-limiting embodiments by reacting 2-methyl-2-dichloromethyl-1,3-dithiolane with dimercaptodiethylsulfide to produce dimercapto-1,3-dithiolane derivative of formula III. Alternatively, 2-methyl-2-dichloromethyl-1,3-dithiolane can be reacted with 1,2-ethanedithiol to produce dimercapto-1,3-dithiolane derivative of formula II. 2-methyl-2-dichloromethyl-1,3-dithiane can be reacted with dimercaptodiethylsulfide to produce dimercapto-1,3-dithiane derivative of formula V. Also, 2-methyl-2-dichloromethyl-1,3-dithiane can be reacted with 1,2-ethanedithiol to produce dimercapto-1,3-dithiane derivative of formula IV.

Another non-limiting example of a dithiol suitable for use as the material (ii) can include at least one dithiol oligomer prepared by reacting dichloro derivative with dimercaptoalkylsulfide as follows:

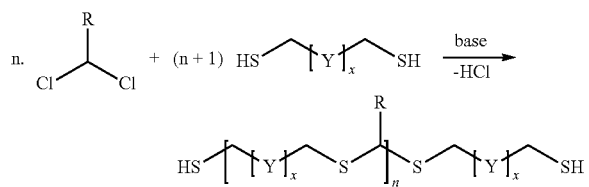

wherein R can represent $CH_3$, $CH_3CO$, $C_1$ to $C_{10}$ alkyl, cycloalkyl, aryl alkyl, or alkyl-CO; Y can represent $C_1$ to $C_{10}$ alkyl, cycloalkyl, $C_6$ to $C_{14}$ aryl, $(CH_2)_p(S)_m(CH_2)_q$, $(CH_2)_p(Se)_m(CH_2)_q$, $(CH_2)_p(Te)_m(CH_2)_q$ wherein m can be an integer from 1 to 5 and, p and q can each be an integer from 1 to 10; n can be an integer from 1 to 20; and x can be an integer from 0 to 10.

The reaction of dichloro derivative with dimercaptoalkylsulfide can be carried out in the presence of a base. Suitable bases include any known to those skilled in the art in addition to those disclosed above.

The reaction of dichloro derivative with dimercaptoalkylsulfide may be carried out in the presence of a phase transfer catalyst. Suitable phase transfer catalysts for use in the present invention are known and varied. Non-limiting examples can include but are not limited to tetraalkylammonium salts and tetraalkylphosphonium salts. This reaction is often carried out in the presence of tetrabutylphosphonium bromide as phase transfer catalyst. The amount of phase transfer catalyst can vary widely, from 0 to 50 equivalent percent, or from 0 to 10 equivalent percent, or from 0 to 5 equivalent percent, relative to the dimercaptosulfide reactants.

The polythiols for use in material (ii) may further contain hydroxyl functionality. Non-limiting examples of suitable materials having both hydroxyl and multiple (more than one) thiol groups can include but are not limited to glycerin bis(2-mercaptoacetate), glycerin bis(3-mercaptopropionate), 1,3-dimercapto-2-propanol, 2,3-dimercapto-1-propanol, trimethylolpropane bis(2-mercaptoacetate), trimethylolpropane bis(3-mercaptopropionate), pentaerythritol bis(2-mercaptoacetate), pentaerythritol tris(2-mercaptoacetate), pentaerythritol bis(3-mercaptopropionate), pentaerythritol tris(3-mercaptopropionate), and mixtures thereof.

In addition to dithiols disclosed above, particular examples of suitable dithiols can include 1,2-ethanedithiol, 1,2-propanedithiol, 1,3-propanedithiol, 1,3-butanedithiol, 1,4-butanedithiol, 2,3-butanedithiol, 1,3-pentanedithiol, 1,5-pentanedithiol, 1,6-hexanedithiol, 1,3-dimercapto-3-methylbutane, dipentenedimercaptan, ethylcyclohexyldithiol (ECHDT), dimercaptodiethylsulfide (DMDS), methyl-substituted dimercaptodiethylsulfide, dimethyl-substituted dimercaptodiethylsulfide, 3,6-dioxa-1,8-octanedithiol, 1,5-dimercapto-3-oxapentane, 2,5-dimercaptomethyl-1,4-dithiane (DMMD), ethylene glycol di(2-mercaptoacetate), ethylene glycol di(3-mercaptopropionate), and mixtures thereof.

Suitable trifunctional or higher-functional polythiols for use in material (ii) can be selected from a wide variety known in the art. Non-limiting examples can include pentaerythritol tetrakis(2-mercaptoacetate), pentaerythritol tetrakis(3-mercaptopropionate), trimethylolpropane tris(2-mercaptoacetate), trimethylolpropane tris(3-mercaptopropionate), and/or thioglycerol bis(2-mercaptoacetate).

For example, the polythiol can be chosen from materials represented by the following general formula,

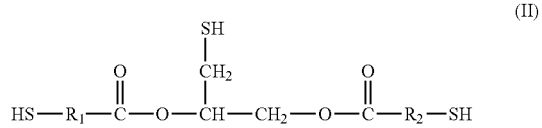

wherein $R_1$ and $R_2$ can each be independently chosen from straight or branched chain alkylene, cyclic alkylene, phenylene and $C_1$-$C_9$ alkyl substituted phenylene. Non-limiting examples of straight or branched chain alkylene can include methylene, ethylene, 1,3-propylene, 1,2-propylene, 1,4-butylene, 1,2-butylene, pentylene, hexylene, heptylene, octylene, nonylene, decylene, undecylene, octadecylene and icosylene. Non-limiting examples of cyclic alkylenes can include cyclopentylene, cyclohexylene, cycloheptylene, cyclooctylene, and alkyl-substituted derivatives thereof. The divalent linking groups $R_1$ and $R_2$ can be chosen from methylene, ethylene, phenylene, and alkyl-substituted phenylene, such as methyl, ethyl, propyl, isopropyl and nonyl substituted phenylene.

In particular embodiments, a polythiol may be prepared by reacting together (1) any of the dithiols mentioned above, and (2) a compound having at least two double bonds (for example, a diene) or a compound having a triple bond, such as propargyl alcohol.

The compound (2) having at least two double bonds can be chosen from non-cyclic dienes, including straight chain and/or branched aliphatic non-cyclic dienes, non-aromatic ring-containing dienes, including non-aromatic ring-containing dienes wherein the double bonds can be contained within the ring or not contained within the ring or any combination thereof, and wherein the non-aromatic ring-containing dienes can contain non-aromatic monocyclic groups or non-aromatic polycyclic groups or combinations thereof; aromatic ring-containing dienes; or heterocyclic ring-containing dienes; or dienes containing any combination of such non-cyclic and/or cyclic groups. The dienes can optionally contain thioether, disulfide, polysulfide, sulfone, ester, thioester, carbonate, thiocarbonate, urethane, or thiourethane linkages, or halogen substituents, or combinations thereof; with the proviso that the dienes contain double bonds capable of undergoing reaction with SH groups of a polythiol, and forming covalent C—S bonds. Often the compound (2) having at least two double bonds comprises a mixture of dienes that are different from one another.

The compound (2) having at least two double bonds may comprise acyclic non-conjugated dienes, acyclic polyvinyl ethers, allyl-(meth)acrylates vinyl-(meth)acrylates, di(meth)acrylate esters of diols, di(meth)acrylate esters of dithiols, di(meth)acrylate esters of poly(alkyleneglycol) diols, monocyclic non-aromatic dienes, polycyclic non-aromatic dienes, aromatic ring-containing dienes, diallyl esters of aromatic ring dicarboxylic acids, divinyl esters of aromatic ring dicarboxylic acids, and/or mixtures thereof.

Non-limiting examples of acyclic non-conjugated dienes can include those represented by the following general formula:

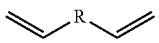

wherein R can represent $C_1$ to $C_{30}$ linear or branched divalent saturated alkylene radical, or $C_2$ to $C_{30}$ divalent organic radical including groups such as but not limited to those containing ether, thioether, ester, thioester, ketone, polysulfide, sulfone and combinations thereof. The acyclic non-conjugated dienes can be selected from 1,5-hexadiene, 1,6-heptadiene, 1,7-octadiene and mixtures thereof.

Non-limiting examples of suitable acyclic polyvinyl ethers can include those represented by the following structural formula:

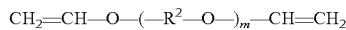

wherein $R^2$ can be $C_2$ to $C_8$ n-alkylene, $C_3$ to $C_6$ branched alkylene group, or $-[(CH_2-)_p-O-]_q-(-CH_2-)_r-$, m can be a rational number from 0 to 10, often 2; p can be an integer from 2 to 6, q can be an integer from 1 to 5 and r can be an integer from 2 to 10.

Non-limiting examples of suitable polyvinyl ether monomers for use can include divinyl ether monomers, such as ethylene glycol divinyl ether, diethylene glycol divinyl ether, triethyleneglycol divinyl ether, and mixtures thereof.

Di(meth)acrylate esters of linear diols can include ethanediol di(meth)acrylate, 1,3-propanediol dimethacrylate, 1,2-propanediol di(meth)acrylate, 1,4-butanediol di(meth)acrylate, 1,3-butanediol di(meth)acrylate, 1,2-butanediol di(meth)acrylate, and mixtures thereof.

Di(meth)acrylate esters of dithiols can include, for example, di(meth)acrylate of 1,2-ethanedithiol including oligomers thereof, di(meth)acrylate of dimercaptodiethyl sulfide (i.e., 2,2'-thioethanedithiol di(meth)acrylate) including oligomers thereof, di(meth)acrylate of 3,6-dioxa-1,8-octanedithiol including oligomers thereof, di(meth)acrylate of 2-mercaptoethyl ether including oligomers thereof, di(meth)acrylate of 4,4'-thiodibenzenethiol, and mixtures thereof.

Further non-limiting examples of suitable dienes can include monocyclic aliphatic dienes such as those represented by the following structural formula:

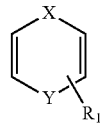

wherein X and Y each independently can represent $C_{1-10}$ divalent saturated alkylene radical; or $C_{1-5}$ divalent saturated alkylene radical, containing at least one element selected from the group of sulfur, oxygen and silicon in addition to the carbon and hydrogen atoms; and $R_1$ can represent H, or $C_1$-$C_{10}$ alkyl; and

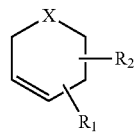

wherein X and $R_1$ can be as defined above and $R_2$ can represent $C_2$-$C_{10}$ alkenyl. The monocyclic aliphatic dienes can include 1,4-cyclohexadiene, 4-vinyl-1-cyclohexene, dipentene and terpinene.

Non-limiting examples of polycyclic aliphatic dienes can include 5-vinyl-2-norbornene; 2,5-norbornadiene; dicyclopentadiene and mixtures thereof.

Non-limiting examples of aromatic ring-containing dienes can include those represented by the following structural formula:

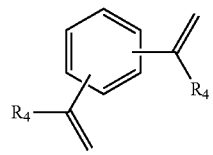

wherein $R_4$ can represent hydrogen or methyl. Aromatic ring-containing dienes can include monomers such as diisopropenyl benzene, divinyl benzene and mixtures thereof.

Examples of diallyl esters of aromatic ring dicarboxylic acids can include but are not limited to those represented by the following structural formula:

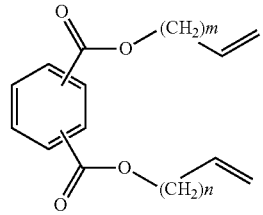

wherein m and n each independently can be an integer from 0 to 5. The diallyl esters of aromatic ring dicarboxylic acids can include o-diallyl phthalate, m-diallyl phthalate, p-diallyl phthalate and mixtures thereof.

Often, the compound (2) having at least two double bonds comprises 5-vinyl-2-norbornene, ethylene glycol divinyl ether, diethylene glycol divinyl ether, triethylene glycol divinyl ether, butane diol divinyl ether, vinylcyclohexene, 4-vinyl-1-cyclohexene, dipentene, terpinene, dicyclopentadiene, cyclododecadiene, cyclooctadiene, 2-cyclopenten-1-yl-ether, 2,5-norbornadiene, divinylbenzene including 1,3-divinylbenzene, 1,2-divinylbenzene, and 1,4-divinylbenzene, diisopropenylbenzene including 1,3-diisopropenylbenzene, 1,2-diisopropenylbenzene, and 1,4-diisopropenylbenzene, allyl(meth)acrylate, ethanediol di(meth)acrylate, 1,3-propanediol di(meth)acrylate, 1,2-propanediol di(meth)acrylate, 1,3-butanediol di(meth)acrylate, 1,2-butanediol di(meth)acrylate, ethylene glycol di(meth)acrylate, diethylene glycol di(meth)acrylate, dimercaptodiethylsulfide di(meth)acrylate, 1,2-ethanedithiol di(meth)acrylate, and/or mixtures thereof.

Other non-limiting examples of suitable di(meth)acrylate monomers can include ethylene glycol di(meth)acrylate, 1,3-butylene glycol di(meth)acrylate, 1,4-butanediol di(meth)acrylate, 2,3-dimethyl-1,3-propanediol di(meth)acrylate, 1,6-hexanediol di(meth)acrylate, propylene glycol di(meth)acrylate, dipropylene glycol di(meth)acrylate, tripropylene glycol di(meth)acrylate, tetrapropylene glycol di(meth)acrylate, ethoxylated hexanediol di(meth)acrylate, propoxylated hexanediol di(meth)acrylate, neopentyl glycol di(meth)acrylate, alkoxylated neopentyl glycol di(meth)acrylate, hexylene glycol di(meth)acrylate, diethylene glycol di(meth)acrylate, polyethylene glycol di(meth)acrylate, thiodiethyleneglycol di(meth)acrylate, trimethylene glycol di(meth)acrylate, triethylene glycol di(meth)acrylate, alkoxylated hexanediol di(meth)acrylate, alkoxylated neopentyl glycol di(meth)acrylate, pentanediol di(meth)acrylate, cyclohexane dimethanol di(meth)acrylate, and ethoxylated bis-phenol A di(meth)acrylate.

The polythiols suitable for use in material (ii) in the preparation of the polyurethane material in the first component, when reacted with a polyisocyanate (i), can produce a polymerizate having a Martens hardness of at least 20 N/mm$^2$, or often at least 50, or more often between 70 and 200. Such polymerizates are typically not elastomeric; i.e., they are not substantially reversibly deformable (e.g., stretchable) due to their rigidity and do not typically exhibit properties characteristic of rubber and other elastomeric polymers.

The active hydrogen component (b) further comprises at least one amino alcohol, a compound containing both amine and hydroxyl functional groups. The amino alcohol has the structure H$_2$N-L-OH, wherein L is a linear or branched alkyl, aryl, aralkyl, or alkaryl chain which may contain hetero atoms. In particular embodiments, the amino alcohol has the structure H$_2$N—CH$_2$-L'-CH$_2$—OH, wherein L' is a linear or branched alkyl, aryl, aralkyl, or alkaryl chain which may contain hetero atoms. Such materials more often have the structure:

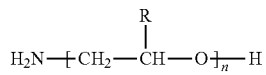

wherein R is H or a C$_1$ to C$_4$ alkyl group and n is an integer from 1 to 10.

As noted above, the amino alcohol is often aliphatic. Aliphatic materials lend better flexibility to the final product, providing better impact resistance. Optical products prepared according to the method of the present invention, with aliphatic materials, also demonstrate better light stability and less yellowing, compared to those prepared with aromatic materials. Aromatic starting materials such as aromatic amines are also known to have relatively short shelf lives and are subject to oxidation and yellowing.

It is somewhat counterintuitive to use aliphatic materials because aliphatic polyamines react too quickly with isocyanates to control the formation of a polyurea, often having very short gel times. However, the use of an aliphatic compound containing both amine and hydroxyl functional groups as in the present invention slows the reaction with the isocyanate compared to a reaction of an aliphatic polyamine with an isocyanate. At the same time, the use of an aliphatic compound containing both amine and hydroxyl functional groups provides for desirable physical properties in the final product such as thermal stability and hardness, allowing for post-production lens processing. It is believed that this is due to the urea linkages present in the polymerizate. Urea linkages also render the final product non-elastomeric.

The compound containing both amine and hydroxyl functional groups typically has a number average molecular weight of 60 to 450. Materials having higher molecular weights may contribute to opaqueness. Often the material containing both amine and hydroxyl functional groups comprises ethanolamine, diethanolamine, amino-2-propanol, 2-amino-1-methyl-1-propanol, 2-amino-1-butanol and/or 2-(2-aminoethoxy)ethanol (diethylene glycolamine, or DGA). Typically the material containing both amine and hydroxyl functional groups is present in the active hydrogen component (b) in an amount of 5 to 70 percent by weight, often 10 to 70 percent by weight, more often 15 to 50 percent by weight, based on the total weight of resin solids in component (b). Typically the material containing both amine and hydroxyl functional groups is present in the reaction mixture in an amount of 5 to 25 percent by weight, based on the total weight of resin solids in the reaction mixture.

As noted above, in certain embodiments of the present invention, the reaction mixture is essentially free of polyamines. In particular, the active hydrogen component (b) is often essentially free of 2,4-diamino-3,5-diethyl-toluene, 2,6-diamino-3,5-diethyl-toluene and mixtures thereof (collectively "diethyltoluenediamine" or "DETDA").

The reaction mixture may further comprise a solvent, particularly when it is used to prepare an optical film. Suitable solvents may include any organic solvents known to those skilled in the art, provided they are not reactive with isocyanate functional groups. Examples are ketones, furans, aromatic solvents, and chlorinated solvents. Suitable solvents can include, but are not limited to: acetone, amyl propionate, anisole, benzene, butyl acetate, cyclohexane, dialkyl ethers of ethylene glycol, e.g., diethylene glycol dimethyl ether and their derivatives (sold as CELLOSOLVE® industrial solvents), diethylene glycol dibenzoate, dimethyl sulfoxide, dimethyl formamide, dimethoxybenzene, ethyl acetate, methyl cyclohexanone, cyclopentanone, methyl ethyl ketone, methyl isobutyl ketone, methyl propionate, propylene carbonate, tetrahydrofuran, toluene, xylene, 2-methoxyethyl ether, 3-propylene glycol methyl ether, methylene chloride, and mixtures thereof. The solvent may be present in the first component in an amount of 0 to 95 percent by weight, or 20 to 95 percent by weight, or 20 to 80 percent by weight, or 40 to 60 percent by weight, based on the total weight of the first component. Typically the solvent is present in an amount such that the viscosity of the first component is reduced to a workable viscosity, such as to a viscosity of 10 to 100 cps, for example to 15 to 20 cps.

In step (2) of the method of the present invention, the isocyanate functional groups are allowed to react with the amine functional groups in the reaction mixture at a temperature and for a time sufficient to form an intermediate product. The intermediate product comprises a polyurea functional prepolymer having hydroxyl functional groups. The intermediate product is in admixture with the polyol and/or polythiol and, optionally, excess amino alcohol from the active hydrogen component (b).

After preparation of the intermediate product described above, it is mixed in step (3) with additional polyisocyanates and optionally a catalyst to form a second reaction mixture. Such mixing may be performed in a urethane mixing machine. The polyisocyanates may be any of those disclosed above, and may be the same as or different from those used in the polyisocyanate component (a). Suitable catalysts can be selected from those known in the art. Non-limiting examples of suitable catalysts can be chosen from the group of Lewis bases, Lewis acids and insertion catalysts as described in Ullmann's Encyclopedia of Industrial Chemistry, 5th Edition, 1992, Volume A21, pp. 673 to 674. The catalyst can be a stannous salt of an organic acid, such as but not limited to stannous octoate, dibutyl tin dilaurate, dibutyl tin diacetate, dibutyl tin mercaptide, dibutyl tin dimaleate, dimethyl tin diacetate, dibutyltin dichloride, 1,4-diazabicyclo[2.2.2]octane, and mixtures thereof. The catalyst can alternately be zinc octoate, bismuth, or ferric acetylacetonate.

Further non-limiting examples of suitable catalysts can include tin compounds such as dibutyl tin oxide, phosphines, tertiary ammonium salts and tertiary amines such as but not limited to triethylamine, triisopropylamine, dimethyl cyclohexylamine, N,N-dimethylbenzylamine and mixtures thereof. Such suitable tertiary amines are disclosed in U.S. Pat. No. 5,693,738 at column 10, lines 6-38, the disclosure of which is incorporated herein by reference.

When employed, the catalyst level can vary and can be dependent upon a variety of factors such as the type and amounts of the reactive compounds used, as well as reaction conditions, speed of reaction, and degree of reaction desired. Typically, an organotin catalyst is present in component B in an amount less than 300 ppm, often less than 250 ppm, and a tertiary amine catalyst is present in an amount less than 1000 ppm, usually less than 800 ppm, often about 720 ppm, based on the total weight of the second reaction mixture.

The second reaction mixture may be immediately formed into a film such as by dispensing onto a support substrate such as in a conventional solvent casting process. Suitable film-forming techniques include: formation of films by casting the film onto a casting roll after extrusion through a flat film-forming die, formation of films by the "blown film" technique wherein a film-forming composition is forced through a circular die and the exiting circular film profile is expanded by compressed air, casting a film-forming composition into a billet or other solid form and subsequently skiving the film from the formed billet, as well as other techniques known in the art. Of these techniques, commonly used methods for the production of film include film casting techniques and the production of film by blown film techniques.

It should further be mentioned that other commonly used additives can be included in the first and/or second reaction mixtures. Such additives can include but are not limited to light stabilizers, heat stabilizers, antioxidants, ultraviolet light absorbers, mold release agents such as ZELEC® UN available from Stepan Company, static (non-photochromic) dyes, pigments and flexibilizing additives.

Support substrates onto which the reaction mixture is cast have smooth surfaces and may comprise, for example, glass, stainless steel, and the like, as well as polymeric substrates for example, polyethyleneterephthalate, polyimide, or silicone, provided the material from which the substrate is made can withstand the subsequent curing temperatures.

The reaction mixture is dispensed onto the support substrate to form a substantially uniform thickness to yield a dry film thickness of 0.5 to 20 mils (12.7 to 508 microns), or 1 to 10 mils (25.4 to 254 microns), or 2 to 4 mils (50.8 to 101.6 microns) after cure.

After application of the reaction mixture to the substrate, an at least partial film is formed on the surface of the substrate by driving solvents out of the film by mild heating or by an air-drying period, typically involving exposure to ambient conditions for about 1 to 20 minutes. The film on the substrate is then heated to a temperature and for a time sufficient to yield a cured film. In the curing operation, solvents are driven off and the reactive functional groups in the reaction mixture are reacted together. In the making of a polyurethane-urea film, for example, the heating or curing operation may be carried out at a temperature in the range of from 100° to 210° C. for a period of 10 to 100 minutes. At this temperature range, reaction mixtures containing polyurethane materials as a first component having number average molecular weights of up to 1500 can cure within 40 to 70 minutes. In alternate embodiments, curing may be carried out at a lower temperature range of ambient (for example 25° C.) to 100° C. for a longer time period of from 100 minutes to five days. Cure temperatures and dwell times will be dependent on the nature of the reactants, including type of reactive groups, the presence of any catalysts, etc.

The cured, non-elastomeric polyurethane-containing film prepared according to the method of the present invention may be used, for example, as one or more of the protective and/or support film layers in a polarizing optical element for use in a multi-layer optical article such as a liquid crystal display (LCD).

Alternatively, the second reaction mixture may be introduced into a mold of any desired shape at a temperature and for a time to form a thermoset polymerizate. The second reaction mixture typically undergoes an exothermic reaction, and after mixing it is introduced, usually by injection, into a mold. The temperature of the reaction mixture as it is introduced into the mold is usually up to 130° C., often up to 120° C. The reaction mixture is held in the mold at a temperature and for a time sufficient to essentially cure the reaction mixture and form a molded optical article. The mold may have any shape desired for the final product. It is typically a lens mold; often a mold for an ophthalmic lens. The molded article may then be released from the mold.

In an embodiment of the present invention wherein the optical article is a lens, the second reaction mixture, which can be optionally degassed, can be introduced, usually by injection, into a mold and the mold can be heated (i.e., using a thermal cure cycle) using a variety of conventional techniques known in the art. The thermal cure cycle can vary depending on the reactivity and molar ratio of the reactants, and the presence of catalyst(s). In particular embodiments, thermal cure cycle can include heating the mixture from room temperature to a temperature of 200° C. over a period of from 0.5 hours to 120 hours; or from 80 to 150° C. for a period of from 5 hours to 72 hours.

Optical articles prepared by the process of the present invention demonstrate high yield, high transparency (light transmittance of at least 80%), very low haze, low flow lines and low inclusions. Moreover, the optical articles prepared by the method of the present invention demonstrate a refractive index of at least 1.52, such as at least 1.53.

The present invention further provides a method of preparing a transparent, non-elastomeric optical article using a "one-batch" or "one-pot" technique. This method comprises the following steps:

(1) combining to form a reaction mixture:
(a) a polyisocyanate component comprising one or more different polyisocyanates; and
(b) an active hydrogen component comprising:
(b1) a first component that is essentially free of amino groups comprising at least one polyol; and
(b2) a second component comprising at least one polyol and/or polythiol and at least one compound containing both amine and hydroxyl functional groups and has the structure $H_2N$-L-OH, wherein L is a linear or branched alkyl, aryl, aralkyl, or alkaryl chain which may contain hetero atoms, wherein the at least one polyol has a number average molecular weight of 60 to 450;
(2) introducing the reaction mixture to a mold of a desired shape at a temperature and for a time sufficient to form a thermoset polymerizate; and
(3) releasing the polymerizate from the mold to yield a transparent optical article.

The polyisocyanate may be any of those disclosed above. The polyisocyanate component typically comprises isophorone diisocyanate, dicyclohexylmethane diisocyanate, hexamethylene diisocyanate, diphenylmethane-4,4'-diisocyanate, meta-tetramethylxylene diisocyanate (1,3-bis(1-isocyanato-1-methylethyl)-benzene), and/or meta-xylylene diisocyanate.

In particular embodiments of the present invention, the reaction mixture, in particular the active hydrogen component (b) is essentially free of polyamines and essentially free of compounds containing both amino and aromatic functionality wherein the amino groups are attached directly to the aromatic ring.

In the active hydrogen component (b), the polyol in the first component (b1) may be any of those disclosed above, provided that less than 40 percent by weight, often less than 35 percent by weight, more often less than 30 percent by weight of the polyols in the first component (b1) has a number average molecular weight greater than 500.

The second component (b2) comprises at least one polyol and/or polythiol, which may be any of those described above. The second component (b2) further comprises an amino alcohol as described above, which often has a number average molecular weight of 60 to 450. The amino alcohol usually comprises ethanolamine or DGA.

The active hydrogen component (b) may further comprise a thiol functional compound as described above.

In step (2) of this method of the present invention, the reaction mixture may be immediately formed into a film such as by dispensing onto a support substrate using casting processes as described above. Alternatively, the reaction mixture may be mixed such as in a urethane mixing machine and introduced into a mold of any desired shape at a temperature and for a time to form a thermoset polymerizate, such as by the reaction injection molding steps described above.

The molded article may then be released from the mold or support substrate in step (3). Optical articles prepared by the process of the present invention demonstrate high yield, high transparency, very low haze, low flow lines, low inclusions, and a refractive index of at least 1.52.

In an additional embodiment of the present invention, a method of preparing a cured, non-elastomeric polyurethane-containing optical article is provided. The method comprises:

(1) combining to form a reaction mixture that is essentially free of urethanation catalysts:
(a) a polyisocyanate component comprising one or more different polyisocyanates; and
(b) an active hydrogen component comprising at least one polyol and/or polythiol and at least one aliphatic compound containing both amine and hydroxyl functional groups wherein the compound containing both amine and hydroxyl functional groups is present in stoichiometric excess with respect to amine groups and has the structure $H_2N$-L-OH, wherein L is a linear or branched alkyl, aryl, aralkyl, or alkaryl chain which may contain hetero atoms;
(2) allowing the polyisocyanate component to react with at least a portion of the amine functional groups in the active hydrogen component at a temperature and for a time sufficient to consume essentially all of the isocyanate functional groups and form an intermediate product comprising a polyurea prepolymer having hydroxyl functional groups in admixture with the polyol and/or polythiol and the compound containing both amine and hydroxyl functional groups;
(3) mixing the intermediate product formed in step (2) with additional polyisocyanates and optionally a urethanation catalyst to form a second reaction mixture;
(4) introducing the second reaction mixture formed in step (3) to a mold of a desired shape at a temperature and for a time sufficient to form a thermoset polymerizate; and
(5) releasing the polymerizate from the mold to yield a transparent optical article.

In step (2) of this method, the isocyanate groups in the polyisocyanate component are allowed to react with the amine functional groups until 1 to 99 percent, such as 10 to 90 percent, or such as at least 20 and up to 90 percent of the amine equivalents are consumed, or at least 20 up to 80 percent, or at least 20 up to 70 percent. In step (2) of the method, the reaction continues for a time sufficient to consume essentially all of the isocyanate functional groups. An intermediate product is formed in step (2) comprising a polyurea prepolymer having hydroxyl functional groups in admixture with the polyol and/or polythiol and the compound containing both amine and hydroxyl functional groups.

In an additional embodiment of the present invention, a method of preparing a cured, non-elastomeric polyurethane-containing optical article is provided. The method comprises:

(1) combining to form a reaction mixture:
(a) a polyisocyanate component comprising one or more different polyisocyanates; and
(b) at least one polyol, wherein the polyisocyanate component is present in stoichiometric excess relative to hydroxyl functional groups;
(2) allowing the components to react at a temperature and for a time sufficient to consume essentially all of the hydroxyl functional groups and form an intermediate product comprising a polyurethane prepolymer having isocyanate functional groups in admixture with excess polyisocyanate;
(3) mixing the intermediate product formed in step (2) with optionally an active hydrogen component comprising at least one polyol and/or polythiol, and at least one compound containing both amine and hydroxyl functional groups wherein the compound containing both amine and hydroxyl functional groups has the structure H₂N-L-OH, wherein L is a linear or branched alkyl, aryl, aralkyl, or alkaryl chain which may contain hetero atoms, to form a second reaction mixture;

(4) introducing the second reaction mixture formed in step (3) via injection to a mold of a desired shape at a temperature and for a time sufficient to form a thermoset polymerizate; and (5) releasing the polymerizate from the mold to yield a transparent optical article.

The various components and process steps may comprise any of those described above.

EXAMPLES

The following examples describe the formation of optical articles according to the present invention. The optical articles are characterized by physical properties. In the foregoing examples, Fisher microhardness ("FMH") values were determined in accordance with ISO 14577 using a H100C Microhardness Measurement System available from Fischer Technologies. ABBE (e) values and Refractive Indices (RI (e)) were determined using a Metricon Model 2010 Prism Coupler, Thin Film Thickness/Refractive Index Measurement System available from Metricon Corporation. Glass Transition Temperatures (Tg) were measured by either differential scanning calorimetry or dynamic mechanical analysis as indicated for each example.

The materials used in the Examples below are abbreviated as follows:

| Name |
| --- |
| Isocyante |
| I1 isophorone diisocyanate |
| I2 4,4'-methylenebis(cyclohexyl isocyanate) |
| I3 VESTANAT ® 1890 (a polyfunctional aliphatic isocyanate from Evonik Industries) |
| I4 DESMODUR ® N3300A (a polyfunctional aliphatic isocyanate from Bayer MaterialScience) |
| I5 DESMODUR ® N3400 (a polyfunctional aliphatic isocyanate from Bayer MaterialScience) |
| I6 DESMODUR ® N3600 (a polyfunctional aliphatic isocyanate from Bayer MaterialScience) |
| Amino Alcohol |
| A1 Ethanolamine |
| A2 Diethanolamine |
| A3 Diethyleneglycolamine |
| A4 amino-2-propanol |
| A5 2-amino-1-methyl-1-propanol |
| A6 2-amino-1-butanol |
| Polyol |
| P1 6-mole ethoxylated Bisphenol A |
| P2 15-mole ethoxylated Bisphenol A |
| P3 30-mole ethoxylated Bisphenol A |
| P4 Ethanediol |
| P5 Propanediol |
| P6 Butanediol |
| P7 Pentanediol |
| P8 diethylene glycol |
| P9 Decanediol |
| P10 polyethylene glycol 200 g/mole |
| P11 polyethylene glycol 400 g/mole |
| P12 polyethylene glycol 600 g/mole |
| P13 DIEXTER ® G 1100-225 (an aliphatic polyester diol from COIM USA, Inc.) |
| P14 CAPA ® 2047A (an aliphatic polyester diol from Perstorp) |
| P15 STEPANOL ® PD-200LV (aromatic polyester diol from Stepan Company) |

| Name |
| --- |
| P16 Trimethylolpropane |
| P17 trimethylolpropane ethoxylate, 170 g/mole |
| P18 trimethylolpropane ethoxylate, 450 g/mole |
| P19 trimethylolpropane ethoxylate, 1014 g/mole |
| P20 15-mole ethoxylated pentaerythritol |
| P21 trimethylolpropane propoxylate, 308 g/mole |
| P22 10-mole ethoxylated Bisphenol A |
| P23 tetrabromo Bisphenol A ethoxylate, 631 g/mole |
| P24 SYN FAC ® 8385 (alkoxylated Bisphenol A from Milliken Chemical) |
| P25 polyethylene glycol, 1000 g/mole |
| P26 polypropylene glycol, 425 g/mole |
| P27 DIEXTER ® G 1100-112 (aliphatic polyester diol from COIM USA, Inc.) |
| P28 DIEXTER ® G 5500-225 (aliphatic polyester diol from COIM USA, Inc.) |
| P29 CAPA ® 2077A (aliphatic polyester diol from Perstorp) |
| P30 Bisphenol A |
| P31 Thiodiglycol |
| P32 Cyclohexanedimethanol |
| Other monomers |
| O1 Methylenedianiline |
| O2 JEFFAMINE ® D230 (amine terminated polyether from Huntsman Corporation) |
| O3 JEFFAMINE ® HK511 (amine terminated polyether from Huntsman Corporation) |
| O4 JEFFAMINE ® XTJ235 (amine terminated Bisphenol A alkoxylate from Huntsman Corporation) |
| O5 2,2'-thiodiethanethiol |

Examples 1-37 illustrate the preparation of optical articles wherein all the materials were mixed together and cast. The constituents of Component A were mixed together, when applicable, in the ratio described in Table 1. This mixture was degassed at room temperature under vacuum for four hours. In a separate vessel, the constituents of Component B were combined and mixed in the ratio described in Table 1, then degassed under vacuum at room temperature for four hours. To cast the compositions, Component A and Component B were then mixed together under vacuum while heating to approximately 80° C. according to the ratios set forth in Table 2. Upon reaching a homogeneous appearance, the resulting mixture was charged to a glass mold of dimensions 15 cm×15 cm×0.3 cm which was preheated to 130° C. The material was cured in an oven at 130° C. for 18 hours. The resulting materials were clear and colorless, exhibiting the properties listed in Table 2.

TABLE 1

| Example | Component A | | Component B | |
| --- | --- | --- | --- | --- |
| | Constitue | Ratio (by | Constituents | Ratio (by weight) |
| 1 | I1:I2 | 0.330:0.670 | A1:P1:P19 | 0.222:0.262:0.517 |
| 2 | I1:I2 | 0.291:0.709 | A1:P1:P17:O2 | 0.269:0.516:0.081:0.134 |
| 3 | I1:I2 | 0.290:0.710 | A1:P1:P17:O3 | 0.270:0.514:0.081:0.135 |
| 4 | I1:I2 | 0.311:0.689 | A1:P1:P15:P1 | 0.240:0.329:0.240:0.190 |
| 5 | I1:I2 | 0.284:0.716 | A1:P1:P10:P2 | 0.276:0.348:0.180:0.196 |
| 6 | I1:I2 | 0.325:0.675 | A1:P1:P10:P1 | 0.364:0.424:0.121:0.091 |
| 7 | I1:I2 | 0.236:0.764 | A1:P1:P5 | 0.348:0.326:0.326 |
| 8 | I1:I2 | 0.210:0.790 | A1:P1:P6:P17 | 0.261:0.353:0.252:0.134 |
| 9 | I2 | — | A1:P1:P11:P1 | 0.347:0.405:0.162:0.087 |
| 10 | I1:I2 | 0.315:0.685 | A1:P1:P17:P2 | 0.236:0.297:0.071:0.396 |

TABLE 1-continued

| Example | Component A Constitue | Ratio (by) | Component B Constituents | Ratio (by weight) |
|---|---|---|---|---|
| 11 | I1:I2 | 0.310:0.690 | A1:P1:P17:P2 | 0.242:0.305:0.073:0.380 |
| 12 | I1:I2 | 0.299:0.701 | A1:P1:P17:P2 | 0.253:0.318:0.076:0.354 |
| 13 | I1:I2 | 0.295:0.705 | A4:P1:P14:P1 | 0.303:0.318:0.303: |
| 14 | I1:I2 | 0.295:0.705 | A1:P1:P17:P2 | 0.258:0.325:0.077:0.340 |
| 15 | I2:I3 | 0.088:0.912 | A1:P1:P10:P1 | 0.311:0.391:0.205:0.093 |
| 16 | I2:I4 | 0.800:0.200 | A1:P1:P10 | 0.307:0.387:0.307 |
| 17 | I2:I6 | 0.800:0.200 | A1:P1:P10 | 0.305:0.384:0.311 |
| 18 | I2:I5 | 0.800:0.200 | A1:P1:P10 | 0.307:0.387:0.307 |
| 19 | I2 | — | A1:P1:P18:O4 | 0.178:0.421:0.178:0.223 |
| 20 | I2 | — | A3:P1 | 0.595:0.405 |
| 21 | I2 | — | A3:P1:P25 | 0.482:0.285:0.253 |
| 22 | I2 | — | A3:P1:P10:P1 | 0.475:0.317:0.096:0.061: |
| 23 | I2 | — | A3:P1:P16 | 0.538:0.419:0.043 |
| 24 | I2 | — | A3:P1:P17 | 0.463:0.463:0.075 |
| 25 | I2 | — | A3:P1:O5 | 0.521:0.190:0.289 |
| 26 | I2 | — | A3:P1:P17:P2 | 0.539:0.323:0.054:0.084 |
| 27 | I2 | — | A3:P1:P17 | 0.615:0.358:0.028 |
| 28 | I2 | — | A3:P11:P17:P | 0.457:0.145:0.074:0.325 |
| 29 | I2 | — | A3:P16:P24 | 0.461:0.078:0.461 |
| 30 | I2 | — | A3:P17:P22 | 0.524:0.025:0.450 |
| 31 | I2 | — | A3:P1:P9:P17 | 0.410:0.317:0.225:0.048 |
| 32 | I2 | — | A3:A4:P1:P17 | 0.176:0.248:0.496:0.080 |
| 33 | I2 | — | A3:A5:P1:P17 | 0.207:0.239:0.477:0.077 |
| 34 | I2 | — | A3:A6:P1:P17 | 0.121:0.322:0.483:0.078 |
| 35 | I2 | — | A3:P1:P17:P3 | 0.534:0.237:0.085:0.144 |
| 36 | I2 | — | A3:P1:P17:O1 | 0.361:0.378:0.72:0.189 |
| 37 | I2 | — | A3:P1:P17:P3 | 0.154:0.308:0.075:0.463 |

TABLE 2

| Example | A:B Cast Ratio | FMH | Tg, DSC | RI (e) | Abbe (e) |
|---|---|---|---|---|---|
| 1 | 0.549:0.451 | 91 | 97 | 1.5258 | 47 |
| 2 | 0.628:0.372 | 141 | 130 | 1.5298 | 47 |
| 3 | 0.630:0.370 | 141 | 130 | 1.5304 | 47 |
| 4 | 0.585:0.416 | 143 | 97 | 1.5311 | 47 |
| 5 | 0.638:0.362 | 143 | 117 | 1.5261 | 47 |
| 6 | 0.671:0.330 | 148 | 132 | 1.5292 | 48 |
| 7 | 0.728:0.272 | 150 | 129 | 1.528 | 47 |
| 8 | 0.790:0.210 | 143 | 120 | 1.5281 | 48 |
| 9 | 0.654:0.346 | 126 | 124 | 1.533 | 48 |
| 10 | 0.577:0.424 | 136 | 100 | 1.5279 | 49 |
| 11 | 0.588:0.413 | 127 | 106 | 1.5268 | 47 |
| 12 | 0.605:0.396 | 141 | 120 | 1.5256 | 48 |
| 13 | 0.604:0.396 | 132 | 108 | 1.5233 | 47 |
| 14 | 0.613:0.388 | 132 | 108 | 1.5232 | 47 |
| 15 | 0.679:0.322 | 133 | 125 | 1.5313 | 49 |
| 16 | 0.674:0.326 | 122 | 98 | 1.5315 | 48 |
| 17 | 0.671:0.328 | 120 | 105 | 1.5311 | 47 |
| 18 | 0.674:0.326 | 114 | 100 | 1.5302 | 49 |
| 19 | 0.551:0.449 | 114 | 98 | 1.5339 | 46 |
| 20 | 0.630:0.370 | 112 | 110 | 1.5321 | 48 |
| 21 | 0.585:0.415 | 91 | 89 | 1.5261 | 49 |
| 22 | 0.621:0.379 | 118 | 103 | 1.5294 | 49 |
| 23 | 0.628:0.372 | 118 | 116 | 1.5319 | 48 |
| 24 | 0.611:0.389 | 119 | 112 | 1.5327 | 48 |
| 25 | 0.654:0.346 | 117 | 122 | 1.545 | 46 |
| 28 | 0.629:0.371 | 116 | 115 | 1.5288 | 48 |
| 27 | 0.641:0.358 | 115 | 119 | 1.5309 | 48 |
| 28 | 0.606:0.394 | 117 | 122 | 1.5345 | 48 |
| 29 | 0.615:0.384 | 124 | 122 | 1.5316 | 46 |
| 30 | 0.607:0.393 | 109 | 101 | 1.5306 | 47 |
| 31 | 0.651:0.349 | 107 | 103 | 1.5274 | 48 |
| 32 | 0.637:0.363 | 129 | 128 | 1.5308 | 48 |
| 33 | 0.623:0.377 | 122 | 121 | 1.5297 | 48 |
| 34 | 0.627:0.373 | 117 | 119 | 1.5303 | 47 |
| 35 | 0.663:0.337 | 116 | 119 | 1.5312 | 48 |
| 36 | 0.603:0.397 | 119 | 132 | 1.5436 | 42 |
| 37 | 0.611:0.389 | 108 | 119 | 1.5269 | 48 |

Examples 38-68 illustrate the preparation of optical articles comprising urea-containing diols which are formed prior to casting by the reaction of amino alcohol and polyols with an isocyanate.

Prior to casting, a urea-containing polyol mixture was synthesized as Component B. For each Component B the following procedure was followed: To a reactor equipped with an agitator and thermometer was charged the amino alcohol and polyol constituents of Component B according to the amounts described in Table 3. The amino alcohol and polyol mixture was stirred to yield a homogeneous solution. The isophorone diisocyanate (I1) constituent of Component B was added dropwise to the solution with stirring, at a rate sufficient to maintain the reaction temperature below 60° C. After the addition, the reaction temperature was maintained between 55-80° C. and stirring was continued until no isocyanate was detected by IR, yielding a clear viscous liquid.

The materials of Examples 38-68 were cast to form optical articles by the following procedure: A quantity of Component B (urea-containing polyol) was stirred at between 60-80° C. under reduced pressure for 4 hours. In a separate vessel, Component A (4,4'-methylenebis(cyclohexyl isocyanate), "I2") was held under reduced pressure until degassed. Component A was then added to Component B in the cast ratio indicated in Table 4 and the resulting mixture was stirred continuously under reduced pressure. Upon reaching clarity, the mixture was poured into a two-part glass mold with a cavity thickness of 0.125 inches. The mold was placed into a preheated oven and subjected to a cure cycle according to Table 4. Upon demolding, a clear hard polymer was obtained, demonstrating the properties listed in Table 4.

TABLE 3

| Example | Component A | Component B Constituents | Ratio (by weight) |
|---|---|---|---|
| 38 | I2 | I1:A1:P1:P10 | 177:96:136:136 |
| 39 | I2 | I1:A1:P1:P6 | 159:86:163:81 |
| 40 | I2 | I1:A1:P1:P6:P17 | 145:78:108:74:40 |
| 41 | I2 | I1:A1:P1:P5 | 173:94:89:89 |
| 42 | I2 | I1:A1:P1:P5 | 153:83:156:78 |
| 43 | I2 | I1:A1:P1:P5:P13 | 153:82:78:78:78 |
| 44 | I2 | I1:A1:P5:P13 | 153:82:78:156 |
| 45 | I2 | I1:A1:P4:P15 | 124:67:64:224 |
| 46 | I2 | I1:A1:P1:P3:P4 | 149:81:37:117:77 |
| 47 | I2 | I1:A1:P1:P5 | 173:94:89:89 |
| 48 | I2 | I1:A1:P1:P16 | 104:57:314:60 |
| 49 | I2 | I1:A1:P1:P3:P10 | 157:86:173:110:81 |

TABLE 3-continued

| | Component | Component B | |
|---|---|---|---|
| Example | A | Constituents | Ratio (by weight) |
| 50 | I2 | I1:A1:P3:P10:P20 | 157:86:164:81:118 |
| 51 | I2 | I1:A1:P1:P3:P10 | 140:76:202:129:72 |
| 52 | I2 | I1:A1:P1:P3:P10 | 123:67:231:148:63 |
| 53 | I2 | I1:A1:P1:P3:P4 | 130:71:56:179:67 |
| 54 | I2 | I1:A1:P2:P10 | 207:112:154:106 |
| 55 | I2 | I1:A1:P1:P19 | 124:67:356:89 |
| 56 | I2 | I1:A1:P1:P19 | 162:87:300:75 |
| 57 | I2 | I1:A1:P1:P17:P18 | 167:91:230:26:60 |
| 58 | I2 | I1:A1:P2:P17:P18 | 159:87:287:25:57 |
| 59 | I2 | I1:A1:P1:P17:P18 | 133:72:313:21:48 |
| 60 | I2 | I1:A1:P1:P17 | 125:68:294:64 |
| 61 | I2 | I1:A1:P1:P17 | 150:81:308:38 |
| 62 | I2 | I1:A1:P1:P17 | 154:84:336:20 |
| 63 | I2 | I1:A1:P1:P10 | 168:91:230:86 |
| 64 | I2 | I1:A1:P1:P2:P17 | 159:87:41:286:41 |
| 65 | I2 | I1:A1:P2:P17:P18 | 155:84:279:46:34 |
| 66 | I2 | I1:A1:P3:P17:P18 | 157:86:284:34:47 |
| 67 | I2 | I1:A1:P1:P8:P16 | 114:62:284:57:15 |
| 68 | I2 | I1:A1:P1:P13:P16 | 173:94:221:89:16 |

TABLE 4

| | A:B Cast | Cure | Physical Properties | | | |
|---|---|---|---|---|---|---|
| Example | Ratio | cycle[1,2] | FMH | Tg[3,4] | RI (e) | Abbe |
| 38 | 0.454:0.546 | 1 | 129 | 84[3] | 1.5283 | 49 |
| 39 | 0.51:0.490 | 1 | 137 | 110[3] | 1.522 | 47 |
| 40 | 0.555:0.455 | 1 | 133 | 115[3] | 1.5275 | 48 |
| 41 | 0.555:0.455 | 1 | 139 | 124[3] | 1.5271 | 49 |
| 42 | 0.53:0.47 | 1 | 137 | 113[3] | 1.53 | 47 |
| 43 | 0.53:0.47 | 1 | 142 | 113[4] | 1.5262 | 50 |
| 44 | 0.53:0.47 | 1 | 144 | 105[4] | 1.5222 | 50 |
| 45 | 0.52:0.48 | 1 | 167 | 130[4] | 1.5293 | 48 |
| 46 | 0.539:0.461 | 1 | 138 | 123[4] | 1.5262 | 50 |
| 47 | 0.555:0.445 | 1 | 148 | 133[4] | | |
| 48 | 0.465:0.535 | 1 | 138 | 92[4] | 1.5375 | 45 |
| 49 | 0.393:0.607 | 1 | 119 | 77[3] | 1.5316 | 48 |
| 50 | 0.395:0.605 | 1 | 80 | 73[3] | 1.5212 | 49 |
| 51 | 0.381:0.619 | 1 | 108 | | 1.5325 | 47 |
| 52 | 0.368:0.632 | 1 | 83 | | 1.5336 | 48 |
| 53 | 0.496:0.504 | 1 | 125 | 102[4] | | |
| 54 | 0.421:0.579 | 2 | 136 | 96[4] | | |
| 55 | 0.364:0.636 | 2 | 118 | 67[4] | | |
| 56 | 0.375:0.625 | 2 | 130 | 83[4] | | |
| 57 | 0.425:0.575 | 2 | 135 | 109[4] | | |
| 58 | 0.385:0.615 | 2 | 94 | 72[4] | 1.5279 | 46 |
| 59 | 0.413:0.587 | 2 | 125 | 91[4] | | |
| 60 | 0.449:0.551 | 2 | 133 | 109[4] | | |
| 61 | 0.422:0.578 | 2 | 135 | 100[4] | | |
| 62 | 0.406:0.594 | 2 | 133 | 100[4] | | |
| 63 | 0.425:0.575 | 2 | 135 | 97[4] | | |
| 64 | 0.386:0.614 | 2 | 111 | 83[4] | | |
| 65 | 0.402:0.598 | 2 | 112 | 84[4] | | |
| 66 | 0.392:0.608 | 2 | 100 | 69[4] | | |
| 67 | 0.468:0.532 | 2 | 131 | 96[4] | 1.5362 | 46 |
| 68 | 0.406:0.594 | 2 | 137 | 98[4] | 1.5336 | 47 |

[1]Cure Cycle 1: Ramp from 50° to 130° C. over 2 hours then hold 8 hours.
[2]Cure Cycle 2: Ramp from 70° to 130° C. over 8 hours then hold 16 hours.
[3]Tg measured by DMA using a Perkin Elmer Pyris Diamond Dynamic Mechanical Analyzer.
[4]Tg measured by DSC using a TA Instruments Q200 Differential Scanning Calorimeter.

Whereas particular embodiments of this invention have been described above for purposes of illustration, it will be evident to those skilled in the art that numerous variations of the details of the present invention may be made without departing from the invention as defined in the appended claims.

What is claimed is:

1. A method of preparing a transparent, non-elastomeric optical article comprising:
   (1) combining to form a reaction mixture:
      (a) a polyisocyanate component comprising one or more different polyisocyanates; and
      (b) an active hydrogen component comprising:
         (b1) a first component that is free of amino groups comprising at least one first polyol; and
         (b2) a second component comprising,
            at least one second polyol and/or at least one polythiol, and
            at least one compound containing both amine and hydroxyl functional groups and has the structure $H_2N$-L-OH, wherein L is a linear or branched alkyl, aryl, aralkyl, or alkaryl chain optionally containing hetero atoms,
            wherein the at least one second polyol has a number average molecular weight of 60 to 450;
   (2) introducing the reaction mixture to a mold at a temperature and for a time sufficient to form a thermoset polymerizate; and
   (3) releasing the polymerizate from the mold to yield a transparent optical article.

2. The method of claim 1, wherein less than 40 percent by weight of the first polyols, based on total weight of first polyols in the first component (b1), have a number average molecular weight greater than 450.

3. The method of claim 2, wherein less than 35 percent by weight of the first polyols, based on total weight of first polyols in the first component (b1), have a number average molecular weight greater than 450.

4. The method of claim 3, wherein less than 30 percent by weight of the first polyols, based on total weight of first polyols in the first component (b1), have a number average molecular weight greater than 450.

5. The method of claim 1 wherein the polyisocyanate component comprises isophorone diisocyanate, dicyclohexylmethane diisocyanate, hexamethylene diisocyanate, diphenylmethane-4,4'-diisocyanate, meta-tetramethylxylene diisocyanate (1,3-bis(1-isocyanato-1-methylethyl)-benzene), and/or meta-xylylene diisocyanate.

6. The method of claim 1 wherein the compound containing both amine and hydroxyl functional groups has a number average molecular weight of 60 to 450.

7. The method of claim 1 wherein the compound containing both amine and hydroxyl functional groups has the structure:

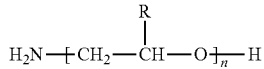

wherein R is H or a $C_1$ to $C_4$ alkyl group and n is an integer from 1 to 10.

8. The method of claim 1 wherein the compound containing both amine and hydroxyl functional groups comprises ethanolamine, amino-2-propanol, 2-amino-1-methyl-1-propanol, 2-amino-1-butanol and/or diethylene glycolamine.

9. The method of claim 1 wherein the reaction mixture is free of polyamines.

10. The method of claim 1 wherein the reaction mixture is free of compounds containing both amino and aromatic functional groups.

11. The method of claim 1 wherein the reaction mixture is free of polyols containing aromatic groups.

12. The method of claim 1 wherein (b2), of the active hydrogen component (b), comprises at least one polythiol.

13. The method of claim 1 wherein the transparent optical article demonstrates a refractive index of at least 1.52.

14. A method of preparing a transparent, non-elastomeric optical article comprising:
  (1) combining to form a reaction mixture:
    (a) a polyisocyanate component comprising one or more different polyisocyanates; and
    (b) at least one first polyol, wherein the polyisocyanate component is present in stoichiometric excess relative to hydroxyl functional groups;
  (2) allowing the components to react at a temperature and for a time sufficient to consume all of the hydroxyl functional groups and form an intermediate product comprising a polyurethane prepolymer having isocyanate functional groups in admixture with excess polyisocyanate;
  (3) mixing the intermediate product formed in step (2) with
    at least one compound containing both amine and hydroxyl functional groups, wherein the compound containing both amine and hydroxyl functional groups has the structure $H_2N$-L-OH, wherein L is a linear or branched alkyl, aryl, aralkyl, or alkaryl chain optionally containing hetero atoms, and
    optionally an active hydrogen component comprising at least one second polyol and/or at least one polythiol,
    to form a second reaction mixture;
  (4) introducing the second reaction mixture formed in step (3) via injection to a mold at a temperature and for a time sufficient to form a thermoset polymerizate; and
  (5) releasing the polymerizate from the mold to yield a transparent optical article.

\* \* \* \* \*